United States Patent
Takeshima et al.

(10) Patent No.: US 7,849,306 B2
(45) Date of Patent: Dec. 7, 2010

(54) RELAY METHOD OF ENCRYPTION COMMUNICATION, GATEWAY SERVER, AND PROGRAM AND PROGRAM MEMORY MEDIUM OF ENCRYPTION COMMUNICATION

(75) Inventors: Yoshiteru Takeshima, Tokyo (JP); Takahiro Ogawa, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1269 days.

(21) Appl. No.: 11/291,929

(22) Filed: Dec. 2, 2005

(65) Prior Publication Data

US 2006/0136724 A1 Jun. 22, 2006

(30) Foreign Application Priority Data

Dec. 2, 2004 (JP) ............................. 2004-350099

(51) Int. Cl.
H04L 1/00 (2006.01)
G06F 7/06 (2006.01)
(52) U.S. Cl. .......................................... 713/153; 726/12
(58) Field of Classification Search ....................... None
See application file for complete search history.

(56) References Cited

U.S. PATENT DOCUMENTS

| | | | | |
|---|---|---|---|---|
| 6,324,648 B1 * | 11/2001 | Grantges, Jr. | ................ | 726/12 |
| 6,550,012 B1 * | 4/2003 | Villa et al. | ..................... | 726/11 |
| 6,584,567 B1 * | 6/2003 | Bellwood et al. | ........... | 713/171 |
| 6,643,701 B1 * | 11/2003 | Aziz et al. | .................. | 709/227 |
| 6,963,972 B1 * | 11/2005 | Chang et al. | ................. | 713/153 |
| 7,430,755 B1 * | 9/2008 | Hughes et al. | ................. | 726/3 |
| 7,506,368 B1 * | 3/2009 | Kersey et al. | ................. | 726/12 |
| 7,584,500 B2 * | 9/2009 | Dillon et al. | ................... | 726/3 |
| 2002/0007415 A1 | 1/2002 | Douglis et al. | | |

(Continued)

FOREIGN PATENT DOCUMENTS

| EP | 1533982 | 5/2005 |
|---|---|---|
| WO | 01/03398 | 1/2001 |

(Continued)

OTHER PUBLICATIONS

European Serch Report, EP 05026251, Mar. 17, 2006, European Patent Office, pp. 1-7.*

(Continued)

*Primary Examiner*—Matthew B Smithers
*Assistant Examiner*—Jeffery Williams
(74) *Attorney, Agent, or Firm*—Antonelli, Terry, Stout & Kraus, LLP.

(57) ABSTRACT

The relay method for relaying an encryption communication in a gateway server between a client device and a content server includes the steps of receiving an encryption communication connection message to the content server from the device; producing a temporary encryption communication permit and a private key of its counterpart for the content server of a destination server name included in the connection message; sending the permit to the device; performing an End-End encryption communication with the device, receiving an encrypted access request message sent by the device, and decrypting and converting the request message to an access request message of a plain text; performing an End-End encryption communication with the content server, and acquiring content information instructed by the access request message; and performing value added processing for the acquired content information and its communication header, encrypting the information and the header, and sending them to the device.

8 Claims, 15 Drawing Sheets

U.S. PATENT DOCUMENTS

| | | | |
|---|---|---|---|
| 2002/0112152 A1* | 8/2002 | VanHeyningen et al. | 713/151 |
| 2002/0157019 A1* | 10/2002 | Kadyk et al. | 713/201 |
| 2002/0169961 A1* | 11/2002 | Giles et al. | 713/175 |
| 2003/0131259 A1 | 7/2003 | Barton et al. | |
| 2004/0255037 A1* | 12/2004 | Corvari et al. | 709/229 |
| 2009/0013399 A1* | 1/2009 | Cottrell et al. | 726/12 |

FOREIGN PATENT DOCUMENTS

WO 2005/060202 6/2005

OTHER PUBLICATIONS

Robinson, Peter, "Understanding Digital Certificates and Secure Sockets Layer (SSL)", Jan. 2001, Entrust, Inc., p. 1-6.*

* cited by examiner

Detection of Special Character Sequence

RELAY METHOD OF ENCRYPTION COMMUNICATION, GATEWAY SERVER, AND PROGRAM AND PROGRAM MEMORY MEDIUM OF ENCRYPTION COMMUNICATION

BACKGROUND OF THE INVENTION

1. Field of the Invention

The present invention relates to a relay method of an encryption communication, a gateway server for relaying the encryption communication, and a program and program memory medium of the encryption communication.

2. Description of the Related Art

A network represented by the Internet is not always secure for communication data flowing therein, and there exist various risks. One of them is a tapping. For example, using special software and hardware, a malicious person can unjustly get personal information such as credit numbers of other persons sent, for example, in online shopping by tapping information flowing in the network. In addition, there is a problem of a server's passing itself off. If a third person passes herself or himself off as an online shop, prepares a dummy order page, and a user inputs personal information such as a credit number without noticing the page as a false shop, the credit number and the like are unjustly gotten.

As a technology for solving the problems of such a tapping and a server's passing itself off and realizing a secure communication, there exist encryption communications based on an SSL (Secure Socket Layer) and a TLS (Transport Layer Security) of its successor. In accordance with these encryption communication methods, for example, a Web server and Web browser for performing an encryption communication firstly perform a handshake such as a change of an encryption key between them; they perform a communication thereafter by encrypted communication. Accordingly, in such a relay unit existing on the way of a network their communication content cannot be decrypted. Thus such a tapping by a third person can be prevented.

Whereas in the above encrypted communication decipherable only by a sender and a receiver (hereinafter referred to as End-End encryption communication) is secured a security of communicated information; on the other hand, there occurs a problem described below.

A gateway server is one of relaying units for connecting an intranet and the Internet and relaying a communication between them. In addition, the gateway server comprises functions of monitoring such as whether or not, for example, a secret document of an enterprise flows out to the Internet from the intranet, and a virus and/or other harmful information flows into an intranet from the Internet. In addition, the gateway server comprises a function of performing a service such as a format conversion of communication data between the intranet and the Internet. The monitoring of such the communication data and the format conversion are often called value added processing, and have become established as part of the functions of the gateway server. In addition, such the value added processing has become performed as a commercial service in an ISP (Internet Service Provider) for providing an Internet connection service.

However, the gateway server cannot provide such a value added processing service to an End-End encryption communication such as the SSL. It is because even the gateway server and an IPS server cannot decipher a cipher in the End-End encryption communication and know a communication content thereof. Accordingly, the gateway server cannot block a virus and/or harmful information sent through an SSL encryption communication by a malicious third person, and cannot also block a secret document from flowing out of an intranet by the SSL encryption communication.

A software product assumed to have solved the problem is on sale as a name of SSL Scanner by WebWasher AG. According to the pamphlet (see "product information WebWasher SSL Scanner" in the Internet, <http://www.webwasher.jp/pro_sslscanner.html> searched on Aug. 6, 2004), the SSL Scanner is communication relay software that is installed in such a gateway server, monitors an SSL encryption communication between a Web server (content server) and a Web client (browser of a client device), and decrypts encryption data. In other words, the SSL Scanner once converts an encryption text of the SSL encryption communication to a plain text, and makes value added processing such as a virus check added to the plain text.

Although in the product information WebWasher SSL Scanner are not in detail explained a method and measure for enabling the SSL Scanner to break in the way of an SSL encryption communication, it is assumed to be based on a method as below: Firstly, an operation administrator of the SSL Scanner distributes a route CA (Certification Authority) certificate thereof and makes its browser install the certificate. Then when performing an SSL encryption communication between the browser and a Web server, the SSL Scanner performs the SSL encryption communication between itself and the browser by sending a server certificate to the browser in making an SSL handshake.

In a mobile communication using such a mobile there also exists an example of decrypting an encryption communication text and performing value added processing for a communication text of a decrypted plain text in a gateway server. A standardization organization OMA (Open Mobile Alliance) for standardizing a data communication method of a movable body defines a WTLS (Wireless Transport Layer Security) specification (see "Wireless Application Forum, Ltd" searched on Aug. 6, 2004 via the Internet, <http://www.openmobilealliance.org/tech/affilates/wap/wap-261-wtls-20010406-a.pdf>) in WAP version 1 to enable an encryption communication between a WAP (Wireless Application Protocol) browser and a gateway server. According to the WAP version 1, the WAP browser on a mobile terminal such as a mobile performs an encryption communication by the WTLS between itself and the gateway server for connecting such the mobile and the Internet, and performs an SSL encryption communication between the gateway server and a Web (WAP) server.

In this case the gateway server once decrypts each encryption communication text to a plain text in order to relay both encryption communication texts. Accordingly, the gateway server can freely perform value added processing for an encryption communication of the WAP specification. In reality, for example, in a system for a mobile a gateway server performs value added processing such as adding a special header to an HTTP header in communication.

However, the SSL Scanner converts an SSL encryption communication text to a plain text and performs value added processing as needed without specifying a content server and client terminal that are performing an SSL encryption communication. Therefore, the SSL Scanner cannot change a setting of an SSL encryption communication method for each content server and client terminal performing the SSL encryption communication, and set performed value added processing. In addition, because a WTLS encryption communication is not a method generally pervaded, there is a problem that it is necessary to add a function of enabling the WTLS encryption communication to a Web browser of a client device.

Considering the problems of the conventional technologies, without adding a special function to a Web browser of a client device are strongly requested a gateway server, a relay method of an encryption communication, and a program and program memory medium of the encryption communication, wherein it is designed for the gateway server to be able to perform value added processing for an End-End encryption communication; and wherein it is designed for the gateway server, the relay method, the program, and the program memory medium to be able to change a setting of a communication method of a content server and a client device and to be able to set performed value added processing, depending on the content server and the client device.

SUMMARY OF THE INVENTION

A relay method of an encryption communication in a gateway server of the present invention in order to solve the problems described above is a method for relaying the encryption communication in the gateway server performed between a client device, which receives a user access request to content information and sends an access request message based on the access request to a network, and a content server, which receives the access request message sent via the network from the client device and sends the content information indicated by the access request message, the method performed by the gateway server comprising: a first step of receiving a connection message for an encryption communication to the content server from the client device; a second step of producing a temporary encryption communication permit and a private key of its counterpart with respect to the content server of a destination server name included in the connection message; a third step of sending the temporary encryption communication permit to the client device; a fourth step of performing an End-End encryption communication with the client device, receiving an encrypted access request message sent by the client device, and decrypting and converting the encrypted access request message to the access request message of a plain text; a fifth step of performing an End-End encryption communication with the content server, depending on the access request message of the plain text, and acquiring content information instructed by the access request message; and a sixth step of performing value added processing for the acquired content information and a communication header thereof, encrypting the content information and the communication header where the value added processing is performed, and sending the content information and the communication header to the client device.

In accordance with the present invention, because a client device receives an encryption communication connection message to be sent to a content server, and produces a temporary encryption communication relay permit and a private key of its counterpart with respect to the client device, a gateway server becomes able to perform an End-End encryption communication between the client device and the gateway server. In addition, the gateway server can perform the End-End encryption communication between itself and the content server, based on an access request to the content server sent from the client device, and acquire a content method requested by the client device. In other words, in the present invention the encryption communication performed between the client device and the content server is once terminated by that between the client device and the gateway server. Accordingly, in the terminated gateway server, because an encryption communication message is made a plain text, various pieces of value added processing become able to be performed for the message made the plain text.

In addition, in the present invention a communication between the client device and the gateway server and that between the gateway server and the content server are performed by the End-End encryption communications, respectively. Accordingly, even if these servers are connected via a network, an information security thereof can be kept.

Another relay method of an encryption communication of the present invention is in the above relay method of the encryption communication a method, wherein a gateway server includes a database for registering a temporary encryption communication relay permit, a private key of its counterpart and an effective date of the key, and any one of a destination server name, an IP address of a sender's client device, and an encryption communication method name included in the encryption communication connection message or all of these, and instead of the second step, the method comprises a seventh step of searching the database with making it a search key any one of the destination server name and the IP address of the sender's client device included in the encryption communication connection message or both of these; resultingly reading a temporary encryption communication relay permit and a private key of its counterpart for a content server of the destination server name from registration information when there exists registration information matching the search key, and an effective date included in the registration information is within an effective period; and producing a temporary encryption communication relay permit and a private key of its counterpart for a content server of the destination server name included in the encryption communication connection message, and registering in the database the produced temporary encryption communication relay permit, the private key of its counterpart and the effective date of the key, and any one of the destination server name, the IP address of the sender's client device, and the encryption communication method name included in the encryption communication connection message or all of these, when there exists no registration information matching the search key or when the effective date included in the registration information is out of date even if there exists the registration information matching the search key.

In accordance with the present invention a temporary encryption communication relay permit, a private key of its counterpart and an effective date of the key, and an encryption communication method name are registered in a database for any one of a destination server name and an IP address of a sender's client device or the pair. If using the database, it is enabled to set any of an encryption communication method and value added processing for each of a client device and a content server or both. Therefore, it becomes able to perform a flexible encryption communication relay.

DESCRIPTION OF THE PREFERRED EMBODIMENTS

First Embodiment

Here will be described a first embodiment of the present invention in detail, referring to FIGS. 1 to 11 as needed.

<Configuration of Network System>

Figure 1:
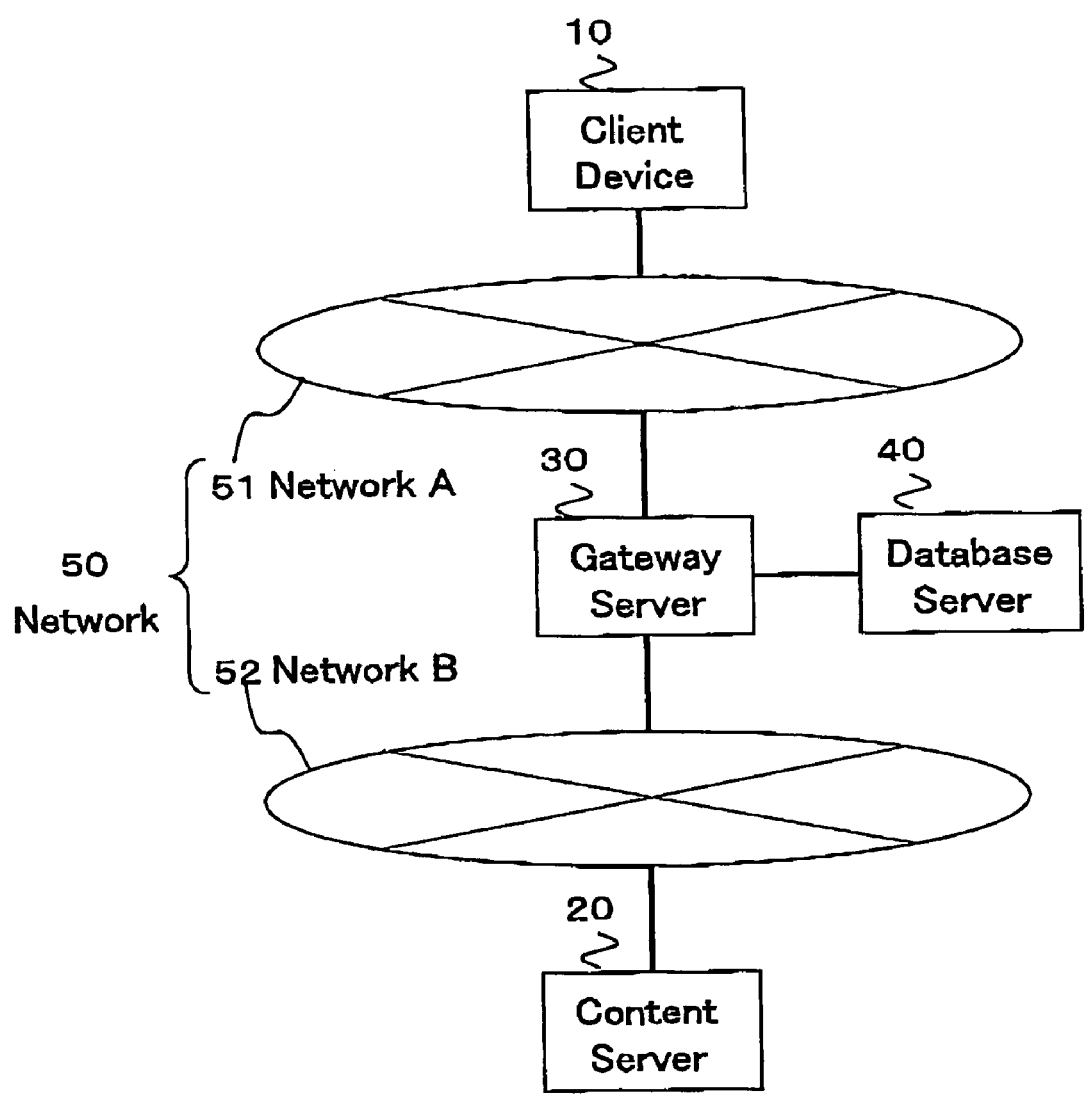
FIG. 1 is a drawing schematically showing a configuration of a network system where the present invention is applied.

FIG. 1 is a drawing schematically showing a configuration of a network system where the present invention is applied. In FIG. 1 a client device 10, a content server 20, a gateway server 30, and a database server 40 are configured with information processing units so called a computer, respectively.

The client device 10 is an information processing unit used by a user, receives an access request of content information by her or him, and sends an access request message based on the access request to the content server 20 via a network 50. The content server 20 is an information processing unit for storing a large amount of useful information (content information), receives the access request message sent from the client device 10, and sends the content information indicated by the access request information to the client device 10.

The client device 10 is connected to the content server 20 via a network A51, the gateway server 30, and a network B52. Here, the network A51 is, for example, an intranet such as a LAN (Local Area Network); the network B52 is, for example, the Internet as a public network. Meanwhile, in the embodiment, when it is not necessary to distinguish between the networks A51 and B52, they are simply called a network 50.

The gateway server 30 is an information processing unit that exists between the networks A51 and B52 and relays a communication performed therebetween. In addition, the database server 40 is an information processing unit for controlling information, for example, by such a relational database, which the information is requested when the gateway server 30 relays a communication between the client device 10 and the content server 20 in the embodiment. The gateway server 30 and the database server 40 will be separately described in detail.

Figure 2:
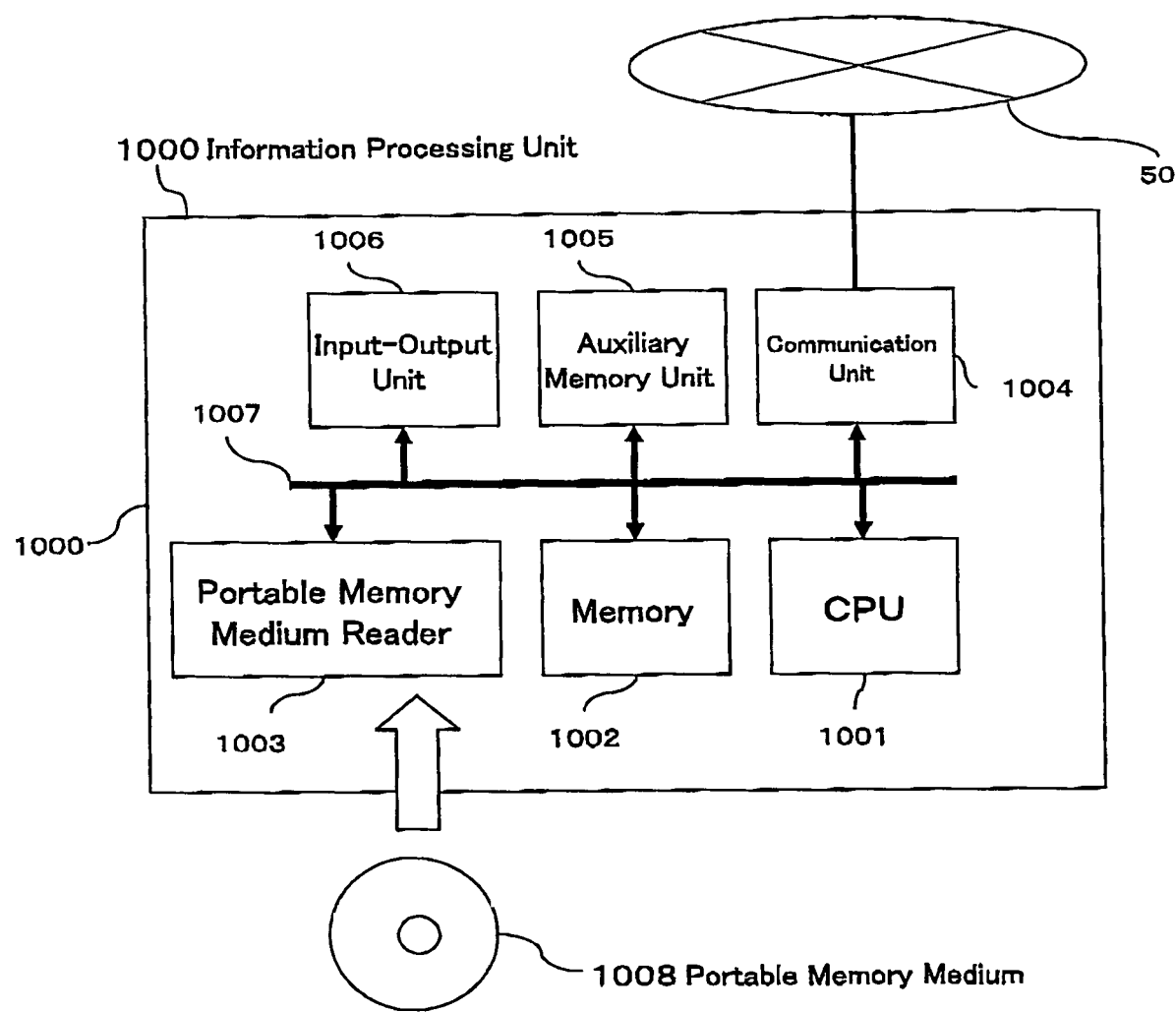
FIG. 2 is a drawing showing a configuration of an information processing unit used in the network system where the present invention is applied.

FIG. 2 is a drawing showing a configuration of an information processing unit used in the network system where the present invention is applied. In FIG. 2 an information processing unit 1000 comprises a CPU (Central Processing Unit) 1001, a memory 1002 configured with a semiconductor memory such as a RAM (Random Access Memory), a portable memory medium reader 1003 such as a CD-ROM (Compact Disk Read Only Memory) drive, a communication unit 1004 connected to the network 50, and an auxiliary memory unit 1005 of an involatile and larger capacity such as a hard disk magnetic memory unit, and an input-output unit 1006 such as a keyboard, a mouse, and a display. In addition, the network 50 is physically configured with a communication line using such as a coaxial cable, an optical fiber, and a radio; and a network device such as a hub and a router.

In the memory 1002 is memorized a program run by the information processing unit 1000. In other words, in each information processing unit 1000 the client device 10, the content server 20, the gateway server 30, and the database server 40 read a predetermined program memorized in a portable memory medium 1008 such as a CD-ROM by the portable memory medium reader 1003 and load the program in the memory 1002. Then the program loaded in the memory 1002 is run by the CPU 1001, and thereby a function specified in each of the client device 10, the content server 20, the gateway server 30, and the database server 40 is realized.

Meanwhile, loading the program in the memory 1002 may be performed from another information processing unit 1000 similarly connected to the network 50 via the network 50 and the communication unit 1004. In addition, using a semiconductor involatile memory as the memory 1002, it is also enabled to write the program therein in advance. If using such a loading mechanism of the program in the memory 1002, it is not always necessary for each of the client device 10, the content server 20, the gateway server 30, and the database server 40 to comprise the portable memory medium reader 1003 and the auxiliary memory unit 1005. For example, the client device 10 may also be the information processing unit 1000 of a smaller type such as a mobile.

In FIG. 1 the client device 10 is the information processing unit 1000 where an existing Web client application program such as a Web browser is run. In other words, the client device 10 is, for example, a PC, a mobile, and the like comprising an Internet communication function. In addition, the content server 20 is the information processing unit 1000 where various server application programs are run: for example, a Web server for providing document and animation image data, and a program file; an application server for providing other Web services; and the like.

In such the client device 10 and the content server 20 the client device 10 firstly sends the content server 20 a communication message (access request) for requesting the server 20 to download a content such as document and animation image data, and a program file. Whereat, in response thereto, the content server 20 sends the content requested by the client device 10 thereto.

The gateway server 30 is a unit for relaying a communication message and can be realized, for example, by a Web proxy server. The gateway server 30 relays the communication message sent from the client device 10 via the network A51 to the content server 20. Information (a host name, an IP address, and the like) of the content server 20 of a destination is included in the communication message of an access request as URL (Uniform Resource Locator) information. In addition, in some case the gateway server 30 comprises a cache function for memorizing a relayed response content as a cache.

In addition, in the embodiment the database server 40 controls requested information in a lump when the gateway server 30 relays a communication between the client device 10 and the content server 20. The database server 40 can be realized, for example, by such a relational database, and process such database search requests, data registration requests, and data delete requests from a plurality of gateway servers 30.

A function realized by each of the client device 10, the content server 20, the gateway server 30, and the database server 40 configuring the network system in FIG. 1 may also be physically realized by one information processing unit 1000. For example, the function of the database server 40 may also be included in the gateway server 30. In addition, a function realized by one unit may also be physically realized by a plurality of units. For example, part of a function included in the gateway server 30 may also be realized by another information processing unit 1000 for communicating with the gateway server 30 via the network 50.

<Configurations of Gateway Server and Database Server>

Figure 3:
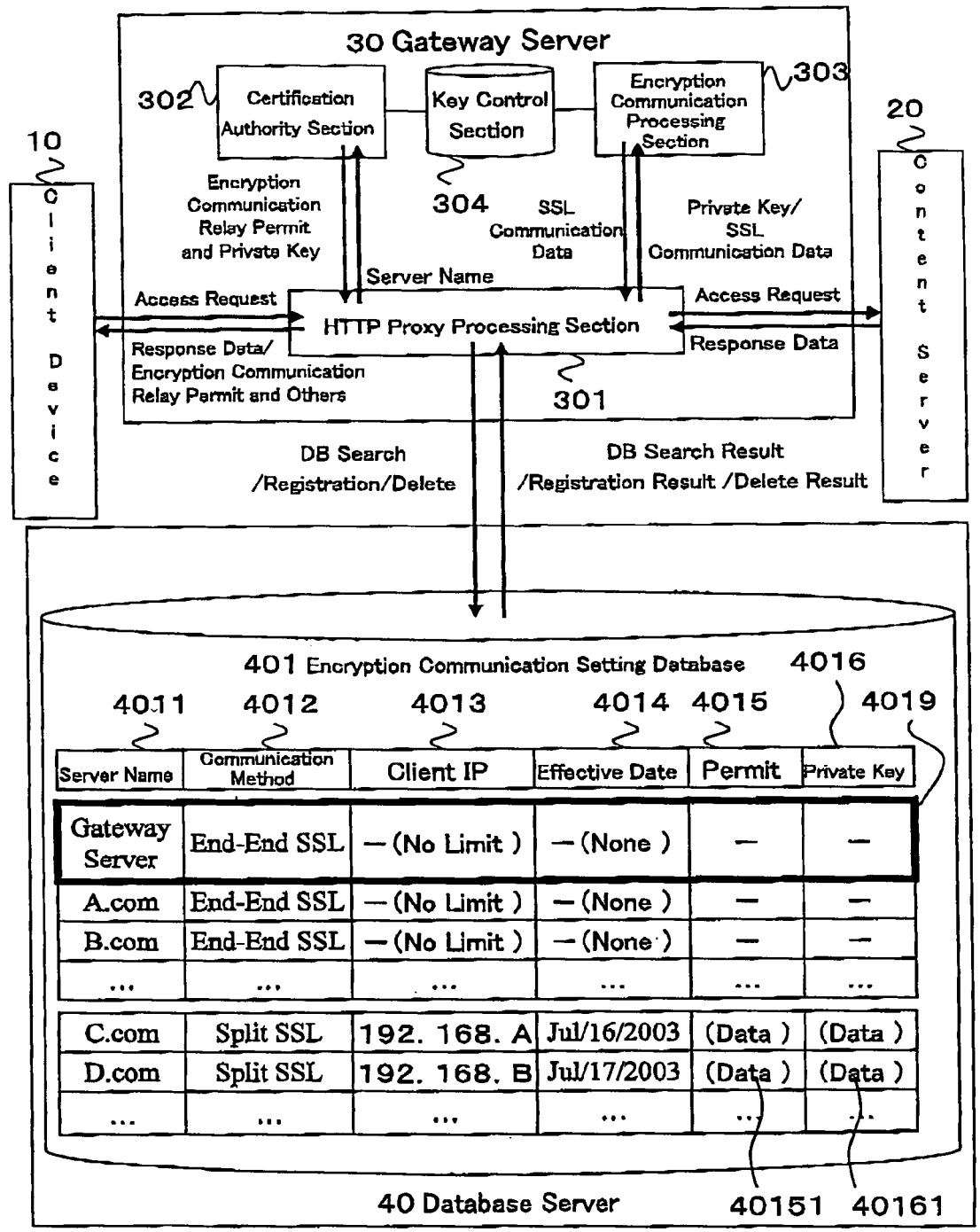
FIG. 3 is a drawing showing configurations of a gateway server and a database server in a first embodiment of the present invention.

FIG. 3 is a drawing showing configurations of the gateway server 30 and the database server 40 in the first embodiment of the present invention. In FIG. 3 the gateway server 30 comprises an HTTP (Hyper Text Transfer Protocol) proxy processing section 301, a certification authority server section 302, an encryption communication processing section 303, and a key control section 304. In addition, the database server 40 comprises an encryption communication setting database 401.

The HTTP proxy processing section 301 relays an access request sent to the content server 20 from the client device 10; in addition, in non-encryption communication the HTTP proxy processing section 301 performs additional processing of caching response data sent to the client device 10 from the content server 20, and the like.

The certification authority server section 302 issues a temporary encryption communication relay permit 40151 having a format of a public key certificate and produces a private key 40161 of its counterpart for a server of a server name instructed by the HTTP proxy processing section 301.

The encryption communication processing section 303 performs an End-End encryption communication between itself and any one of the client device 10 and the content server 20 via the HTTP proxy processing section 301; in addition, the processing section 303 caches a content downloaded from the content server 20 by the End-End encryption communication.

The key control section 304 keeps and controls private key and public key certificates for the gateway server 30 issued from a route CA (Certification Authority), and a route CA certificate for verifying the public key certificate of the content server 20.

In FIG. 3 the database server 40 comprises the encryption communication setting database 401. The database 401 is constructed, for example, by using a relational database. The gateway server 30 performs such a search, registration, and delete of the encryption communication setting database 401 for the database server 40, using a database operation language such as an SQL (Structured Query Language).

The encryption communication setting database 401 is a database of a table format and used for controlling a setting of an encryption communication. Setting information of the encryption communication is controlled for every content server name and client IP address. In other words, the encryption communication setting database 401 comprises such a server name field 4011, a communication method field 4012, a client IP address field 4013, an effective date field 4014, an encryption communication relay permit field 4015, and a private key field 4016. In addition, the encryption communication setting database 401 controls these pieces of information per an entry 4019. Namely, the processing of such a search, registration, and delete of the encryption communication setting database 401 is handled per the entry 4019. Meanwhile, the entry is called a record in some case.

Here will be in detail described each field 4011 to 4016 of the encryption communication setting database 401.

The server name field 4011 is a field for controlling a host name of the content server 20 connected to the network B52. The host name is memorized in a FQDN (full Qualified Domain name) format such as "www.example.com" or an IP address format such as "192.168.1.1".

The communication method field 4012 is a field for controlling an encryption communication method between the client device 10 and the content server 20. As an example of the communication method, there exist: a usual SSL encryption communication (hereinafter referred to as "End-End SSL" method) performed between the client device 10 and the content server 20; and an SSL encryption communication (hereinafter referred to as "SPLIT SSL" method) where the SSL encryption communication between the client device 10 and the content server 20 is terminated and separated into that with the client device 10 and that with the content server 20. In other words, in the "SPLIT SSL," encryption communication data of the SSL encryption communication between the client device 10 and the content server 20 is once decrypted and returned to a plain text in the gateway server 30.

Meanwhile, as an encryption communication, a TLS encryption communication is also available other than the SSL encryption communication.

The client IP address field 4013 is a field for controlling an IP address of the client device 10. However, because there can exist a case of a client IP address varying for every communication, depending on a system configuring the network A51, in that case the client IP address field 4013 may control not the client IP address but basically certification information (user ID and/or telephone number). In a setting example of a communication method in FIG. 3 is applied the communication method of the End-End SSL regardless of client IP addresses with respect to accesses to servers of server names "A.com" and "B.com". In addition, with respect to a server name "C.com" is applied the communication method of the "SPLIT SSL" in a case that a client IP address is "192.168.A". In addition, with respect to a server name "D.com" is applied the communication method of the "SPLIT SSL" in a case that a client IP address is "192.168.B".

The effective date field 4014 is a field for controlling effective date information set by each entry 4019. With respect to an entry 4019 having effective date data in the effective date field 4014 is set date information of an effective date (time may be included); with respect to an entry 4019 having no effective date data is set "-(No Effective Date)" therein.

The encryption communication relay permit field 4015 is a field for controlling data of the encryption communication relay permit 40151. The gateway server 30 registers the data of the encryption communication relay permit 40151 in the encryption communication relay permit field 4015. By the registration, in a case that there are a plurality of gateway servers 30, even if the client device 10 accesses any gateway server 30 if the server 30 satisfies conditions of such the client IP address 4013, the destination server name 4011, and the effective date 4014, it can bring out the same encryption communication relay permit 40151 from the encryption communication setting database 401 and respond to the client device 10.

The private key field 4016 is a field for controlling data of a private key. The gateway server 30 registers data of its own private key in the private key field 4016. By the registration, in a case that there are a plurality of gateway servers 30 even if the client device 10 accesses any gateway server 30 if the server 30 satisfies conditions of such the client IP address 4013, the destination server name 4011, and the effective date 4014, the server 30 can bring out the same private key from the encryption communication setting database 401, and use it for an encryption communication with the client device 10.

The data registered in each field 4011 to 4016 thus described can be acquired by searching the encryption communication setting database 401. In the search, if searching the encryption communication setting database 401 with making any one of field values as a search key, information of the entry 4019 matching a condition thereof can be obtained. In the example of FIG. 3, if the gateway server 30 sends a query text by a search key of [server name="A.com"] to the database server 40, the server 40 searches an entry 4019 including the "A.com" in the server field 4011 within the encryption communication setting database 401. Then the database server 40 makes to the gateway server 30 a response of information of the entry 4019 of [communication method="End-End SSL," client IP address="No Limit," effective date="No Limit," encryption communication relay permit="None," and private key="None"] to the gateway server 30. Meanwhile, the information responded by the database server 40 may be made only field information requested by the gateway server 30. Requested field information can be specified by a parameter of a query text.

<SSL Encryption Communication Relay Processing>

Figure 4:
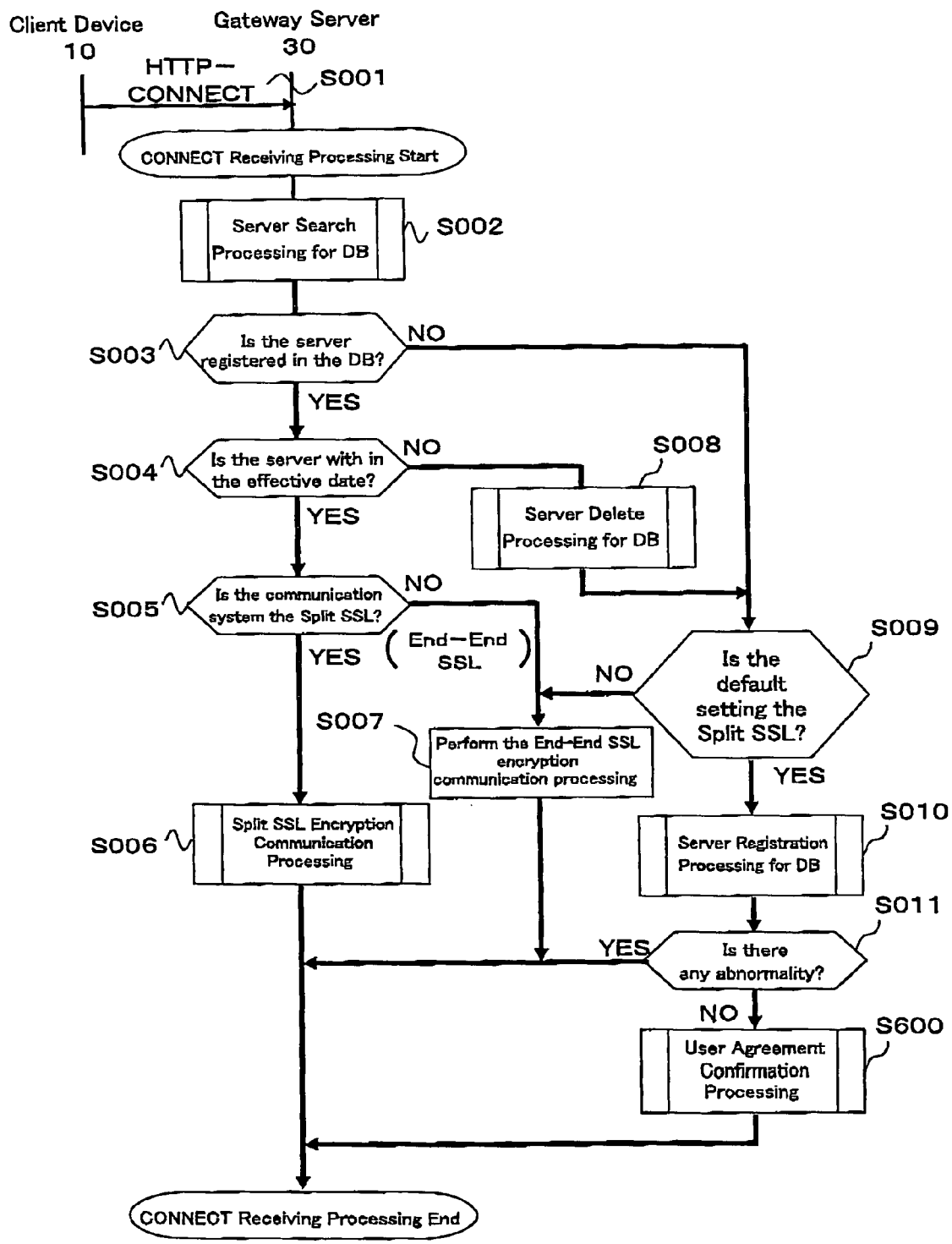
FIG. 4 is a drawing showing flow of processing of the gateway server's relaying an SSL encryption communication between a client device and a content server in the first embodiment of the present invention.

FIG. 4 is a drawing showing flow of processing of the gateway server's 30 relaying an SSL encryption communication between the client device 10 and the content server 20 in the first embodiment of the present invention. The processing flow expresses a transition state: the gateway server's 30 having established a TCP (Transmission Control Protocol) connection with the client device 10, after then receiving a CONNECT method of an HTTP from the client device 10, performing any one of the End-End SSL encryption communication and the Split SSL encryption communication, till ending the processing of the CONNECT method.

In FIG. 4 the HTTP proxy processing section 301 firstly receives (step S001) an access request including the CONNECT method of the HTTP from the client device 10. The CONNECT method is a method of instructing the gateway server 30 to perform the TCP connection used for an SSL encryption communication with the content server 20. If receiving the CONNECT method, the gateway server 30 starts CONNECT receiving processing.

Next, the HTTP proxy processing section 301 of the gateway server 30 extracts the server name or IP address of the content server 20 of a destination from a communication message of the access request of the CONNECT method. For example, in a case that there exists a character sequence of "CONNECT www.example.com:443HTTP/1.1" at a first line (request line) of the received HTTP access request message, the HTTP proxy processing section 301 extracts the character sequence of the "www.example.com" and handles it as a server name thereof. The HTTP proxy processing section 301 makes any one of the server name and the IP address a search key, and performs (step S002) server search processing for the encryption communication setting database 401 (simply described as DB in FIG. 4) for the database server 40. Meanwhile, the server search processing will be separately described more in detail, using FIG. 5.

Meanwhile, depending on a setting of the client device 10 if any, the client device 10 does not send the CONNECT method, sets the IP address of the content server 20 of the destination as a destination IP address from the start, sends an IP packet, and performs a handshake of the SSL encryption communication. In a case that the gateway server 30 receives the IP packet, the server 30 checks a destination port number in a TCP header included in the IP packet, and if the destination port number is a port number, for example, "443" meaning the SSL encryption communication, the server 30 assumes that the handshake of the SSL encryption communication is performed in a packet after a TCP handshake. Then the HTTP proxy processing section 301 handles the destination IP address in the header as the IP address of the content server 20 of the destination, uses the IP address, instructs (the step S002) a server search for the database server 40, and performs processing thereafter.

Next, using a search result in the database server 40, the HTTP proxy processing section 301 determines (step S003) whether or not the searched server is already registered in the database server 40. As a result, in a case that server information including the search key in the server name field 4011 is responded (YES in the step S003), the HTTP proxy processing section 301 determines that the searched server is already registered in the encryption communication setting database 401; in a case that the server information including the search key is not responded (NO in the step S003), the processing section 301 determines that the searched server is a server not registered.

Consequently, in a case that the server name of the content server 20 of the destination of the CONNECT method is already registered (YES in the step S303), the HTTP proxy processing section 301 next checks (step S004) an effective date. In other words, because the gateway server 30 controls a current date and time by any one of software and hardware, it compares a value of the effective date field 4014 obtained as the search result with the current date and time.

Then in a case (YES in the step S004) that the time is within the effective date, the HTTP proxy processing section 301 next checks (step S005) a communication method. For example, the HTTP proxy processing section 301 determines whether a value of the communication method field 4012 obtained as the search result is the "Split SSL" method or the "End-End SSL" method.

Then if the communication method is the "Split SSL" method (YES in the step S005), the HTTP proxy processing section 301 performs (step S006) the Split SSL encryption communication processing. The Split SSL encryption communication processing is processing that: the gateway server 30 behaves as an SSL server in a communication with the client device 10; terminates the SSL encryption communication with the client device 10; and performs a new SSL communication between itself and the content server 20.

Then, if the TCP connection is cut off by any one of the content server 20 and the client device 10, the HTTP proxy processing section 301 ends the Split SSL encryption communication processing. Or else due to some reason such as a timeout, the HTTP proxy processing section 301 may also cut off the TCP connection with the client device 10 and that with the content server 20, and thereby, positively end the Split SSL encryption communication processing. After then, the gateway server 30 ends the CONNECT receiving processing.

On the other hand, in the step S005, in a case (NO in the step S005) that the communication method is the "End-End SSL" method, the HTTP proxy processing section 301 performs (step S007) the End-End SSL encryption communication processing. The End-End SSL encryption communication processing is a usual encryption communication method for an HTTP proxy server's relaying an SSL encryption communication. To be more precise, when the gateway server 30 receives an HTTP-CONNECT method from the client device 10, it firstly performs a TCP connection to the content server 20 instructed as a CONNECT destination. Next, after a TCP handshake is normally completed, the gateway server 30 sends the client device 10 a message for indicating a connection completion. The message is, for example, a message of "HTTP/1.1 200 Connection established" described at a first line (status line) of an HTTP response. After then, the gateway server 30 transfers application data sent from the client device 10 or the content server 20 to the content server 20 or the client device 10. Meanwhile, the gateway server 30 appropriately converts portions other than application data such as a TCP header and an IP header, depending on the TCP connection.

In addition, if the TCP connection is cut off by any one of the content server 20 and the client device 10, the HTTP proxy processing section 301 ends the End-End SSL encryption communication processing. Or else due to some reason such as a timeout, the HTTP proxy processing section 301 may also cut off the TCP connection with the client device 10 and that with the content server 20, and thereby, positively end the End-End SSL encryption communication processing. After then, the gateway server 30 ends the CONNECT receiving processing.

In addition, in the step S004, if the effective date is over (NO in the step S004), the HTTP proxy processing section 301 performs (step S008) delete processing of the entry 4019 of the encryption communication setting database 401 for the database server 40.

Then, the HTTP proxy processing section 301 checks (step S009) a default setting of the SSL encryption communication processing out of a setting of the gateway server 30 in a case that the information of the content server 20 is not registered in the encryption communication setting database 401. As a result, in a case (NO in the step S009) that the default setting is the End-End SSL encryption communication processing, the HTTP proxy processing section 301 performs the processing of the step S007.

On the other hand, in a case (YES in the step S009) that the default setting is the Split SSL encryption communication processing, the HTTP proxy processing section 301 performs (step S010) information registration processing of the content server 20. Then, in a case that the registration processing is normally completed (NO in step S011) the HTTP proxy processing section 301 performs (step S600) user agreement confirmation processing. The user agreement confirmation processing will be separately described in detail. In addition, in a case (YES in the step S011) that the user agreement confirmation processing is abnormally completed, the HTTP proxy processing section 301 ends the CONNECT receiving processing by positively cutting off the TCP connection with the client device 10.

Furthermore, in the step S003, in a case (NO in the step S003) that the server name of the content server 20 of the destination of the CONNECT method is not registered, the HTTP proxy processing section 301 performs the processing following the step S009.

Figure 5:
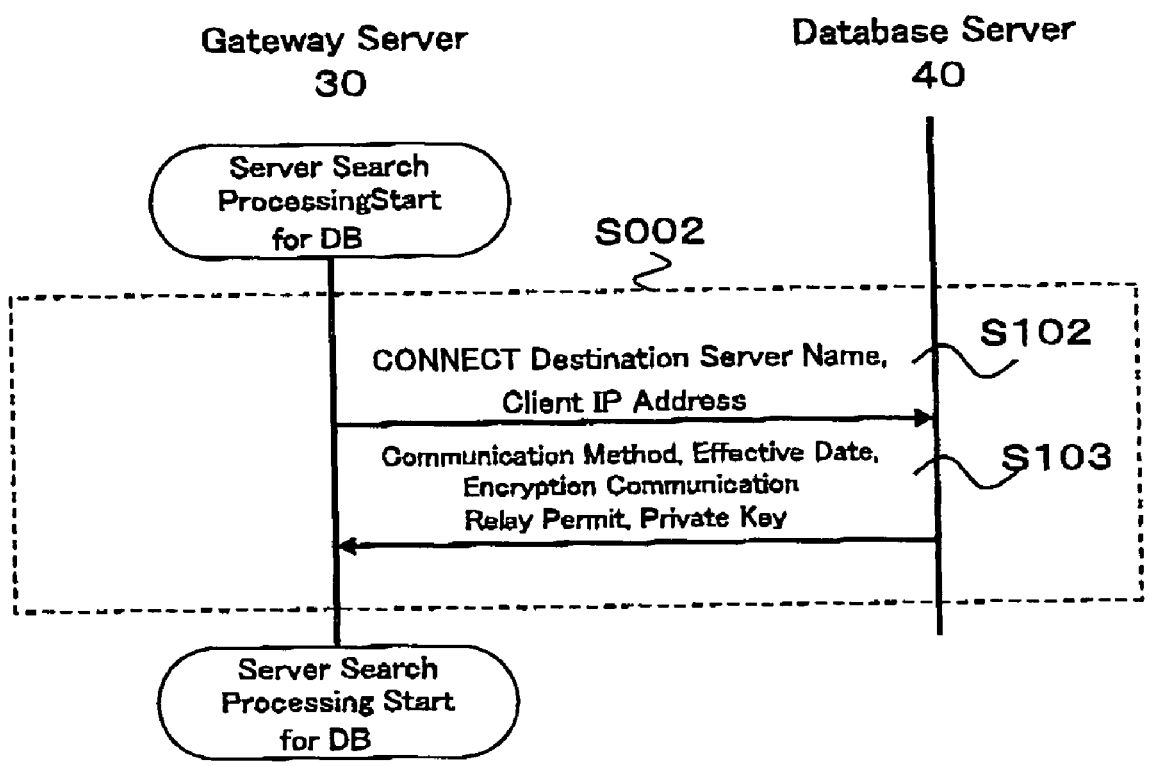
FIG. 5 is a drawing in detail showing flow of server search processing (step S002) for an encryption communication setting database in FIG. 4.

FIG. 5 is a drawing in detail showing flow of server search processing (step S002) for the encryption communication setting database in FIG. 4.

In FIG. 5 the HTTP proxy processing section 301 (see FIG. 3) of the gateway server 30 firstly issues (step S102) a query request for the database server 40, making it a search key a CONNECT destination server name and a client IP address. The query request is, for example, handed over to the database server 40 in an SQL format. If so, the database server 40 interprets the query request and searches an entry 4019 where a same value as the CONNECT destination server name is stored in the server name field 4011 of the encryption communication setting database 401 and a same value as the client IP address is stored in the client IP address field 4013. Then, if there exists the entry 4019, the database server 40 makes a response (step S103) of the entry 4019 to the HTTP proxy processing section 301. If there does not exist the entry 4019, the database server 40 makes a response of no search result. The response of the search result includes at least a value of the communication method field 4012, that of the effective field 4014 of the entry 4019 itself, the encryption communication relay permit 40151, and the private key 40161 of the counterpart of the permit 40151.

Figure 6:
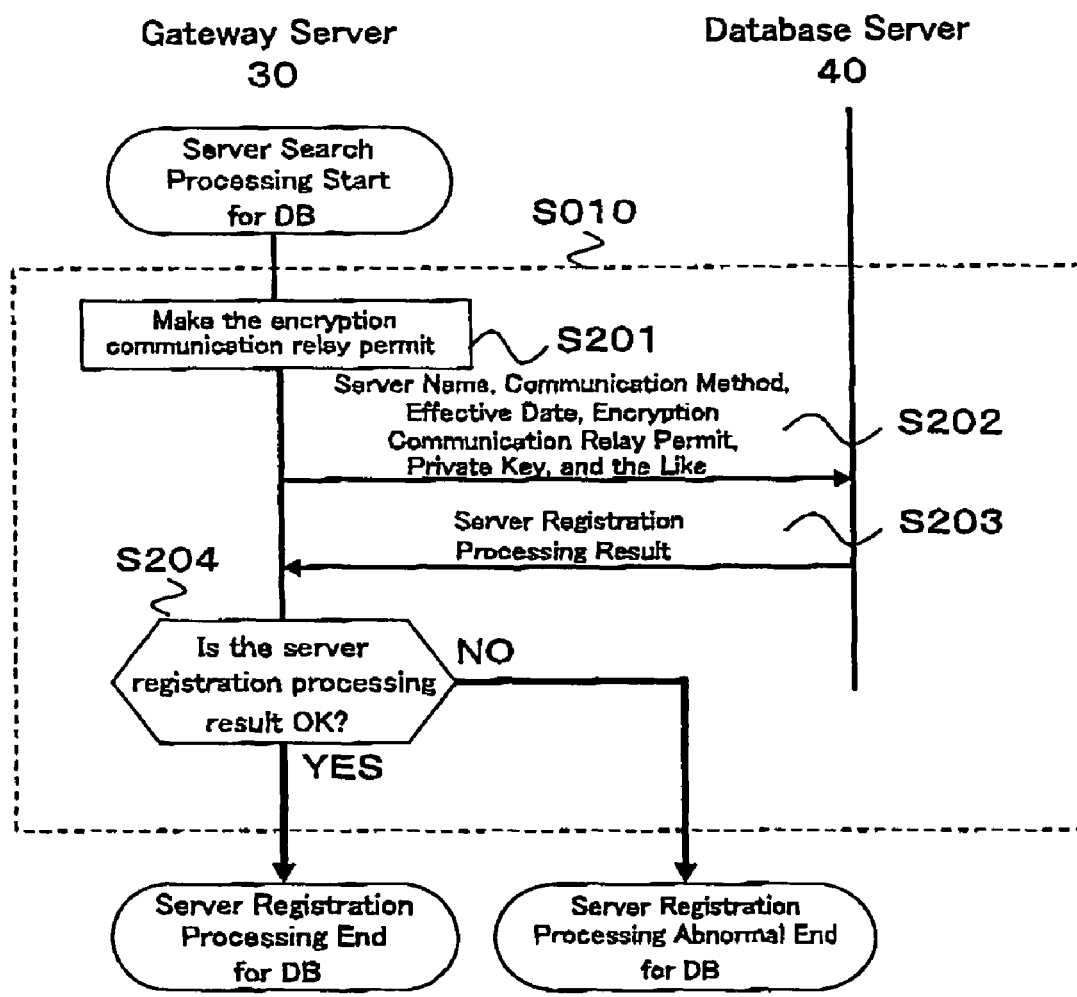
FIG. 6 is a drawing in detail showing flow of server registration processing (step S010) for the encryption communication setting database in FIG. 4.

FIG. 6 is a drawing in detail showing the flow of the server registration processing (step S010) for the encryption communication setting database in FIG. 4.

In FIG. 6 the gateway server 30 firstly produces (step S201) the encryption communication relay permit 40151 for the CONNECT destination server name. The encryption communication relay permit 40151 is a server public key certificate for performing an End-End encryption communication such as an SSL encryption communication. The server public key certificate is based, for example, on the X.509 specification recommended by the ITU-T (International Telecommunication Union-Telecommunication sector). Therein is included information such as an issuer and primary person (possessor) of the certificate, an effective date, public key information, and an electronic signature of the issuer required for verifying the effectiveness of the certificate.

Generally, a certification authority (CA) issues a server public key certificate for such an administrator of the content server 20. When downloading the server public key certificate, a user verifies it, using a CA electronic signature therein and a CA server public key certificate held by her or him in advance. A CA relied on by the user is here called a route CA. The user installs the server public key certificate of the route CA in such a browser of the client device 10, and thereby, it is enabled for her or him to verify a server public key certificate issued by any one of the route CA and another CA relied on by the route CA.

In a case of downloading a server public key certificate issued by a CA not relied on by the route CA, the browser of the client device 10 notices a user in some case, issuing a warning message. The encryption communication relay permit 40151 and the private key 40161 of its counterpart are issued every time when the certification authority server section 302 of the gateway server 30 receives a CONNECT method. The primary person of the encryption communication relay permit 40151 is the name of the content server 20 of a CONNECT destination, and the issuer is the gateway server 30.

Next, the HTTP proxy processing section 301 performs (step S202) an entry additional request for the database server 40. Additional information is the name of the content server 20 of the CONNECT destination, a communication method, a client IP address, an effective date, the encryption communication relay permit 40151, the private key 40161, and the like. The communication method is, for example, the "Split SSL" method. The effective date is set, for example, as a date and time where a parameter value is added to a current time, based on a parameter set in advance in the gateway server 30. Citing a concrete example, if a receiving time of the CONNECT method is [2003/7/15, 12:00:00] and a parameter value is [one day], an effective date is set as [2003/7/16, 12:00:00].

Next, the database server 40 makes a response of a registration processing result to the HTTP proxy processing section 301 (step S203).

The HTTP proxy processing section 301 determines the response result (step S204). In a case that the registration processing is completed without a trouble, the HTTP proxy processing section 301 ends the registration processing (YES in the step 204); in a case that the registration processing fails, the processing section 301 abnormally ends the registration processing (NO in the step 204).

Figure 7:
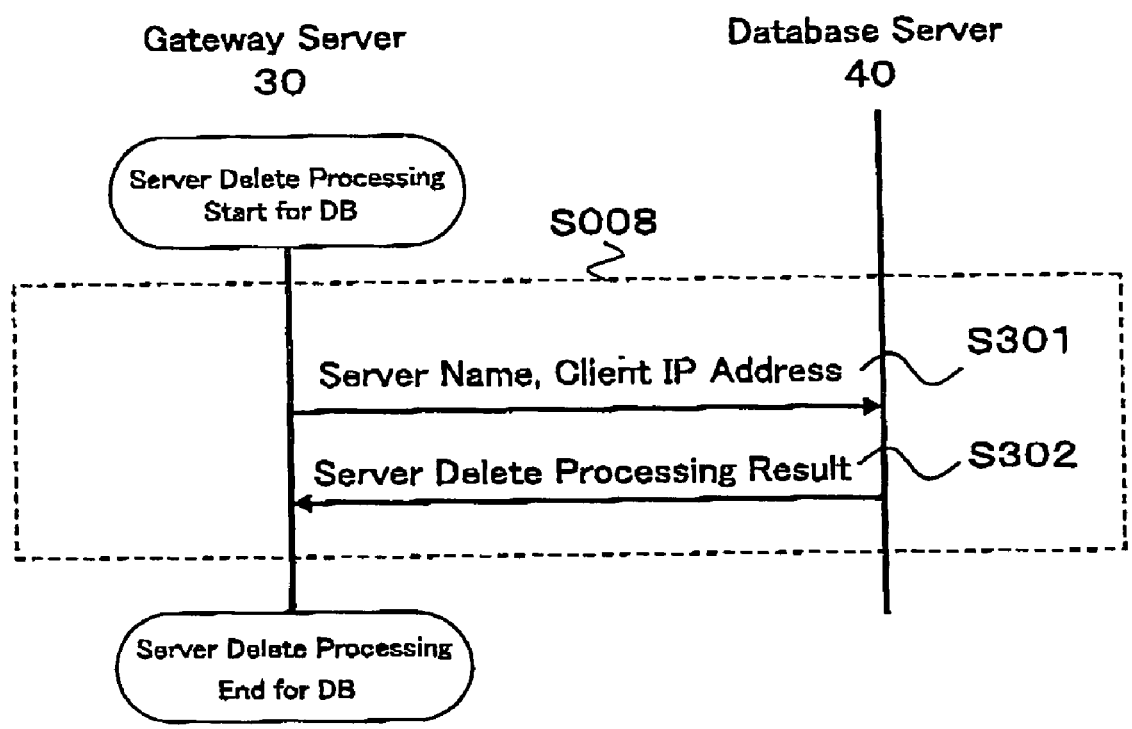
FIG. 7 is a drawing in detail showing flow of server delete processing (step S008) for the encryption communication setting database in FIG. 4.

FIG. 7 is a drawing in detail showing the flow of the server delete processing (step S008) for the encryption communication setting database in FIG. 4.

The HTTP proxy processing section 301 (see FIG. 3) firstly requests (step S301) an entry delete of the encryption communication setting database 401 for the database server 40. A deleted entry 4019 is, for example, one satisfying a search condition, making it a search key a CONNECT destination content server name and a client IP address.

Next, the database server 40 makes a response of a delete processing result to the HTTP proxy processing section 301 (step S302). The HTTP proxy processing section 301 receives the response result and ends the delete processing.

Figure 8:
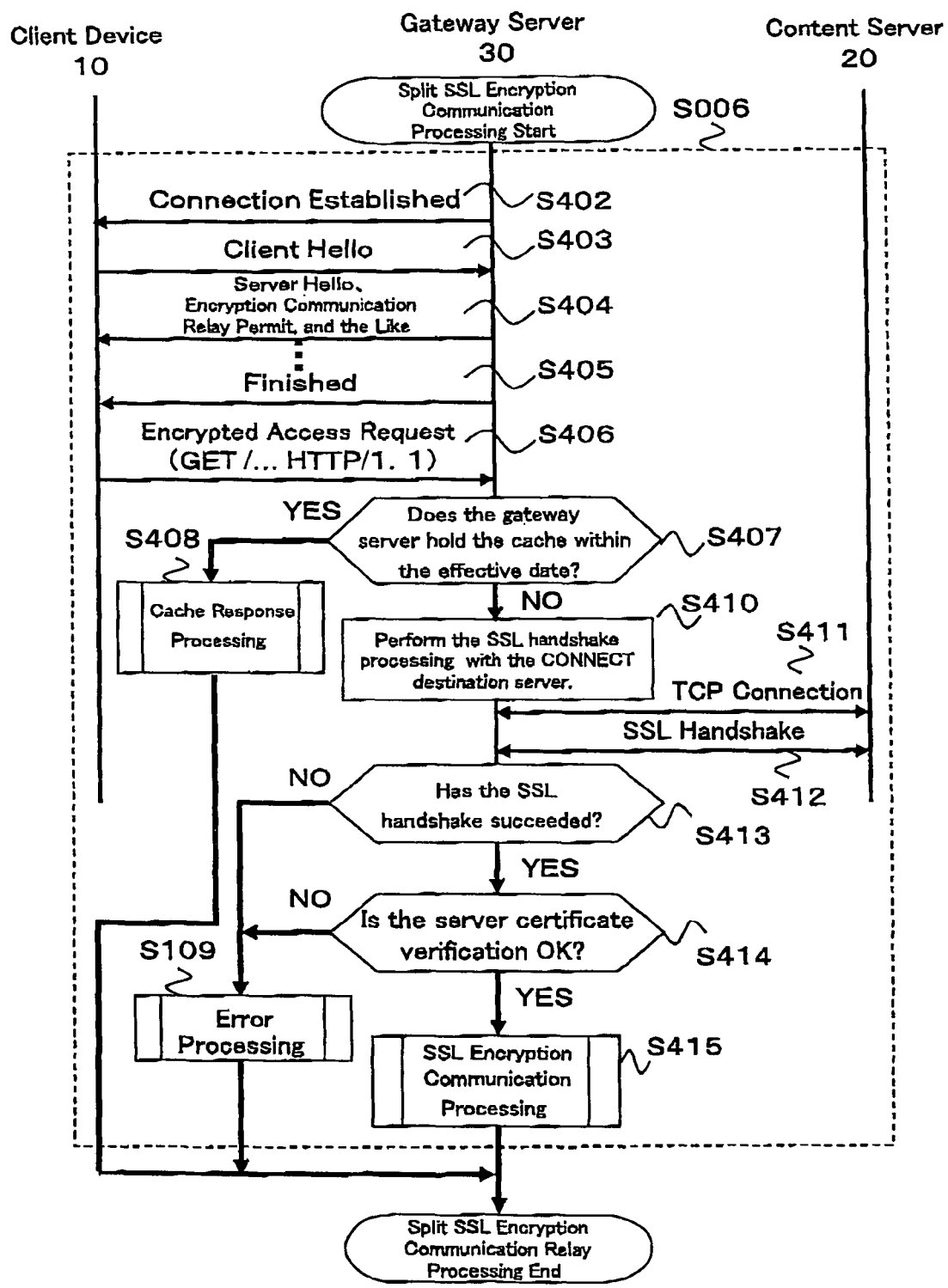
FIG. 8 is a drawing in detail showing flow of Split SSL encryption communication processing (step S006) in FIG. 4.

FIG. 8 is a drawing in detail showing the flow of the Split SSL encryption communication processing (step S006) in FIG. 4.

Starting the Split SSL encryption communication processing, the HTTP proxy processing section 301 (see FIG. 3) progresses the processing, making the encryption communication processing section 303 an SSL server of the CONNECT destination. To be more precise, the HTTP proxy processing section 301 hands over the encryption communication relay permit 40151 and the private key 40161 obtained in the step S103 to the encryption communication processing section 303. Then the HTTP proxy processing section 301 writes data received from the client device 10 in the memory 1002. Then the encryption communication processing section 303 reads the data from the memory 1002. Then performing the reverse processing, the HTTP proxy processing section 301 receives and hands over data between the client device 10 and the encryption communication processing section 303.

In addition, in a case that the encryption communication processing section 303 operates on the information processing unit 1000 different from that of the HTTP proxy processing section 301, the processing sections 301 and 303 communicate via the network 50, and receive and hand over data. The HTTP proxy processing section 301 sends data received and handed over from the encryption communication processing section 303 to the client device 10 as it is, or adding and deleting an HTTP header for a communication between the client device 10 and the processing section 301. In addition, the HTTP proxy processing section 301 similarly receives and hands over data received from the client device 10 to the encryption communication processing section 303.

Next, after sending a response for the CONNECT method to the client device 10, the encryption communication processing section 303 performs SSL handshake processing (steps S402 to S405). In the step S404, when sending a server public key certificate to the client device 10, the encryption communication processing section 303 sends the encryption communication relay permit 40151 by proxy, instead of the server public key certificate of the content server 20.

Next, the encryption communication processing section 303 receives an encrypted access request from the client device 10 and decrypts it (step S406). Here, the encryption communication processing section 303 analyzes the server name of the content server 20 of the CONNECT destination and a URL in the received access request, and checks whether or not a content of an access request destination is already cached; if already cached, the processing section 303 checks (step S407) whether or not the content is within a cache effective date thereof. In a case that the gateway server 30 holds the cache within the effective date (YES in the step S407), the encryption communication processing section 303 performs cache response processing (step S408) and ends the Split SSL encryption communication processing.

In addition, in the step S407, in a case of no existence of the cache or out of the effective date if any (NO in the step S407), the encryption communication processing section 303 performs the SSL handshake processing for the content server 20 of the CONNECT destination (steps S410 to S412). Here, when performing an HTTP connection with the content server 20, the encryption communication processing section 303 sends the CONNECT method to the HTTP proxy processing section 301, the processing section 301 analyzes a name of the content server 20 of the CONNECT destination and performs the TCP connection and the SSL handshake processing with a relevant content server 20, and thereby, the processing section 303 may communicate with the content server 20 via the processing section 301. In addition, the encryption communication processing section 303 may directly perform the TCP connection and the SSL handshake processing with the content server 20. Then the encryption communication processing section 303 determines whether or not the handshake processing has succeeded as the result of the SSL handshake processing (step S413).

In a case that the SSL handshake processing has succeeded (YES in the step S413), the encryption communication processing section 303 then verifies a server public key certificate (step S414). Then in a case that the verification has succeeded (YES in the step S414), the encryption communication processing section 303 performs SSL encryption communication relay processing (step S415), and after then, ends the Split SSL encryption communication processing. In addition, in a case that the SSL handshake processing has failed in the step S413 or the verification of the server public key certificate has failed in the step S414, the encryption communication processing section 303 performs error processing (step S109) and ends the Split SSL encryption communication processing.

Figure 9:
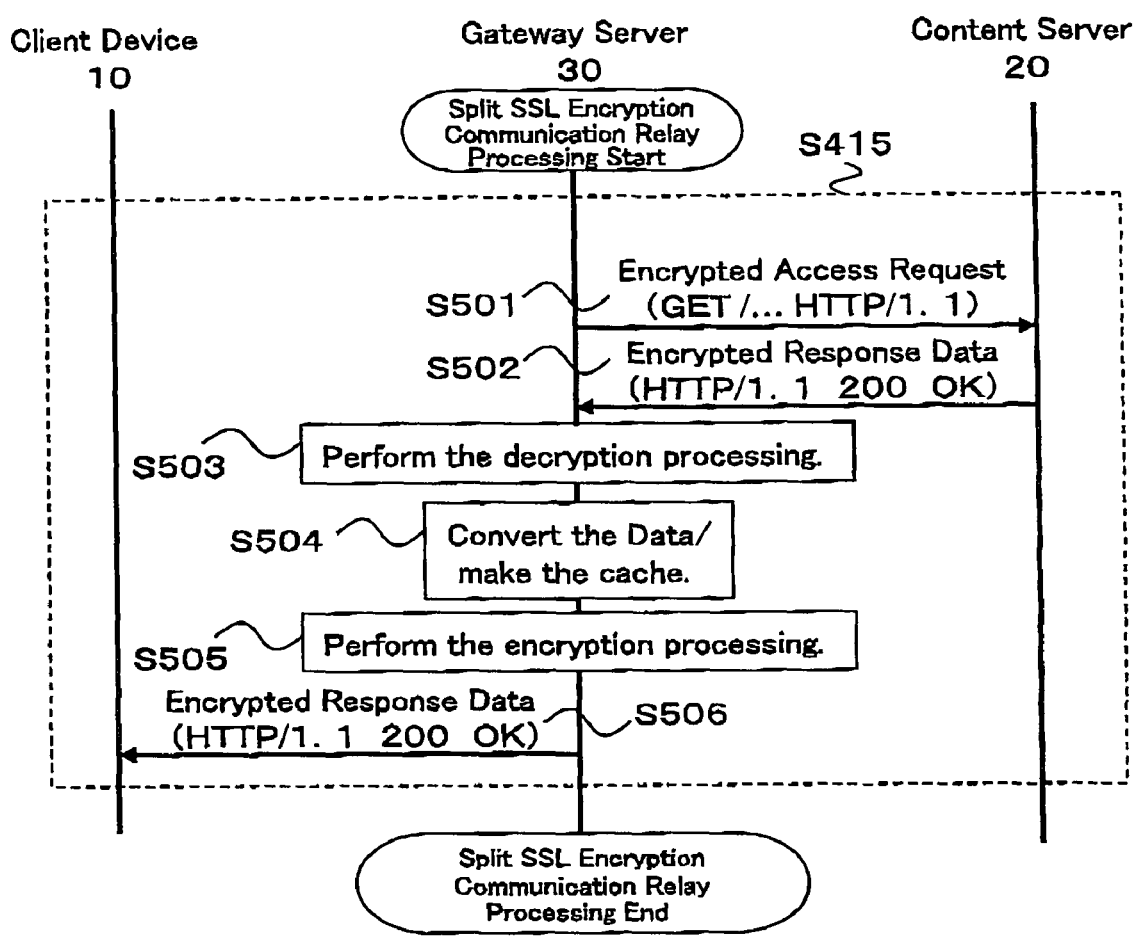
FIG. 9 is a drawing in detail showing flow of SSL encryption communication relay processing (step S415) in FIG. 8.

FIG. 9 is a drawing in detail showing the flow of the SSL encryption communication relay processing (step S415) in FIG. 8.

The encryption communication processing section 303 (see FIG. 3) encrypts an access request to the URL of the access request destination and firstly sends it to the content server 20 of the CONNECT destination (step S501), using the SSL connection established in the steps S410 to S412. Whereat, the content server 20 encrypts response data for the access request and sends it to the encryption communication processing section 303 (step S502).

The encryption communication processing section 303 performs decryption processing of the received data (step S503), and performs value added processing such as a conversion of a data format and cache making (step S504). Here, as an example of the value added processing other than this, there exist: such processing of an addition, modification, and delete of an HTTP header and content data; HTTP error processing in the step S109; or communication processing with other servers according to an analysis result of the content data. Meanwhile, the example of the value added processing will be additionally described, using FIG. 14.

Next, the encryption communication processing section 303 again encrypts (step S505) the data for the SSL encryption communication with the client device 10 and sends it thereto (step S506); and ends the SSL encryption communication relay processing. Or else, after the step S506, in a case of again receiving the same encryption access request as in the step S406, the encryption communication processing section 303 may repeat the processing following the step S406. In addition, in that case it may be designed that the encryption communication processing section 303 provides a time limit and ends the SSL encryption communication relay processing if the time limit is over.

Figure 10:
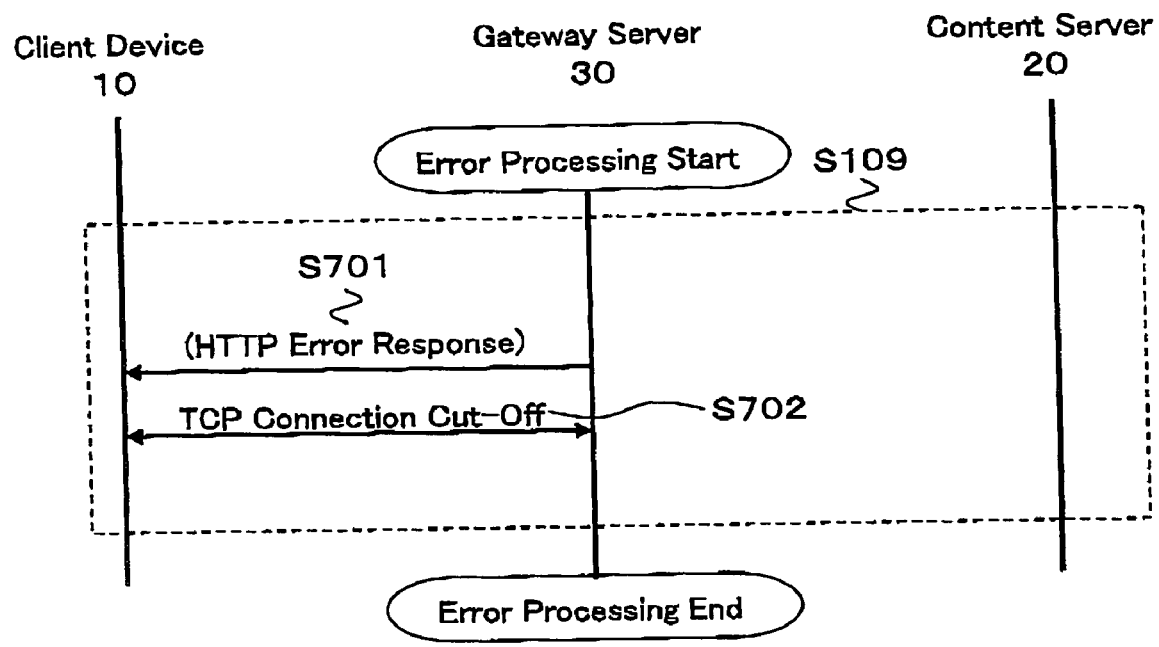
FIG. 10 is a drawing in detail showing flow of error processing (step S109) in FIG. 8.

FIG. 10 is a drawing in detail showing the flow of the error processing (step S109) in FIG. 8.

In a case that there occurs some error during processing in any of the HTTP proxy processing section 301 and the encryption communication processing section 303 of the gateway server 30 (see FIG. 3), the processing sections 301 and/or 303 makes an error message and sends it to the client device 10 (step S701); and after then, cuts off the TCP connection with the client device 10 (step S702). Here, the step S701 may also be omitted. In addition, the processing section 301 and/or 303 may make an error log file and output such an error reason therein.

Figure 11:
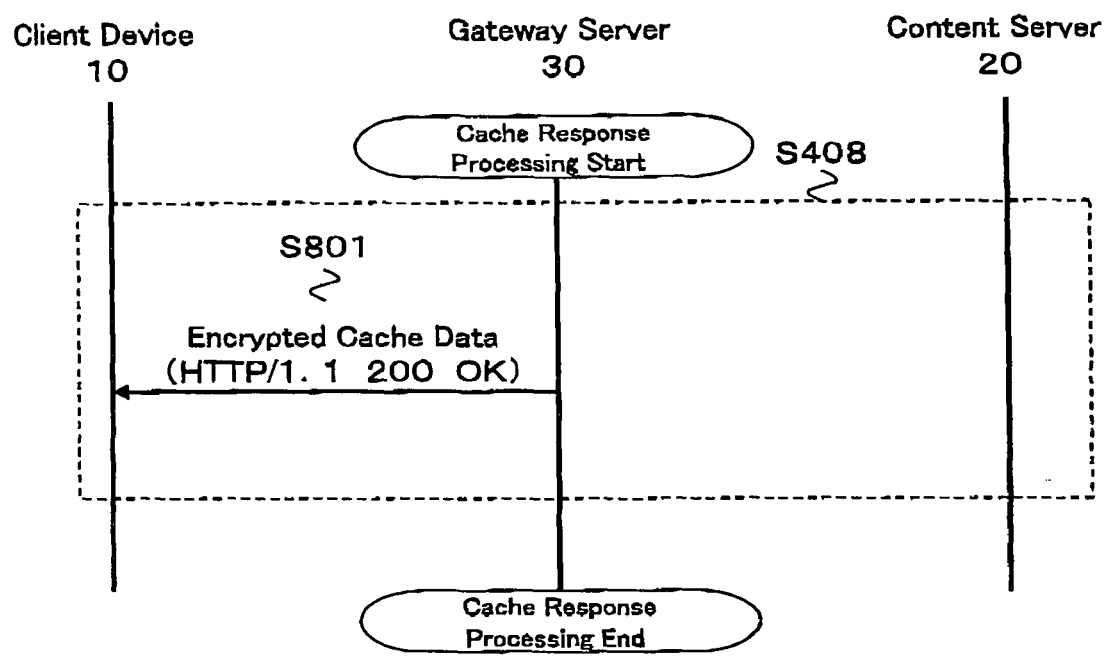
FIG. 11 is a drawing in detail showing flow of cache response processing (step S408) in FIG. 8.

FIG. 11 is a drawing in detail showing the flow of the cache response processing (step S408) in FIG. 8.

The encryption communication processing section 303 of the gateway server 30 (see FIG. 3) caches a content in an encryption communication in such the step S504 (see FIG. 9) of the SSL encryption communication relay processing, and stores cache data in any one of the memory 1002, the auxiliary memory unit 1005, and the like. In the cache response processing (the step S408) the encryption communication processing section 303 makes HTTP response data, using the cache data, and encrypts it by a common key made in the SSL handshake with the client device 10; and then sends the data thereto (step S801).

<User Agreement Confirmation Processing>

Figure 12:
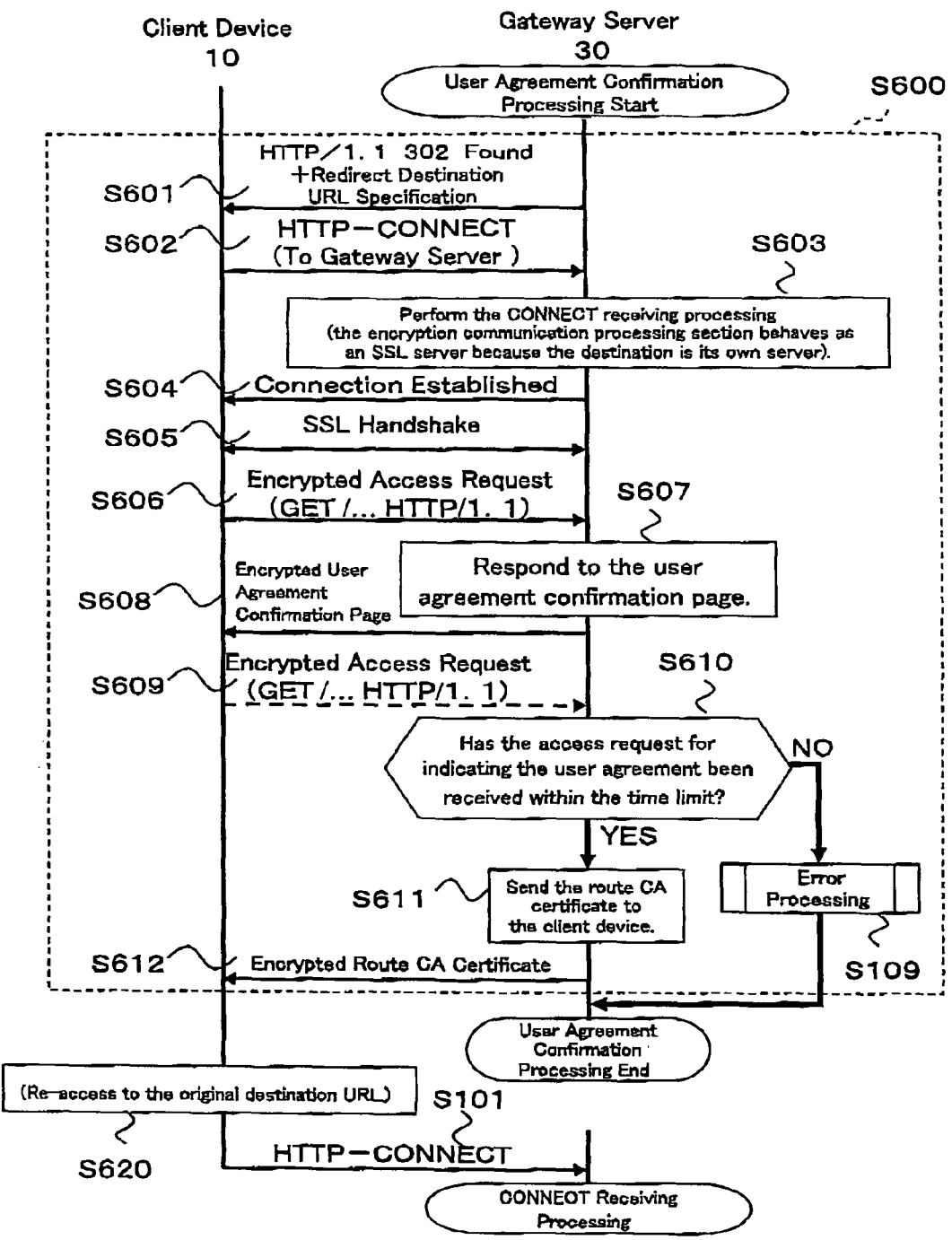
FIG. 12 is a drawing in detail showing flow of user agreement confirmation processing (step S600) in FIG. 4.

FIG. 12 is a drawing in detail showing the flow of the user agreement confirmation processing (step S600) in FIG. 4. The user agreement confirmation processing is processing for obtaining a user agreement on performing a relay by terminating an encryption communication by the gateway server 30.

Firstly, the HTTP proxy processing section 301 of the gateway server 30 (see FIG. 3) sends the client device 10 an instruction of redirecting a URL of the SSL server of the encryption communication processing section 303. As a concrete example, the HTTP proxy processing section 301 makes a response of an HTTP response status as follows (step S601):

"HTTP/1.1 302 Found

Location:https://GatewayServer:443/ . . .

. . ."

Here, a value indicated in the Location field indicates the URL of a redirect instruction destination. A URL host name of the redirect instruction destination is assumed to be a host name for expressing the gateway server 30 comprising the encryption communication processing section 303. In addition, a URL scheme is assumed to be "https" for expressing an encryption communication such as an SSL. The path portion of the URL may exist or not. In addition, the encryption communication processing section 303 may here dynamically make a user agreement confirmation page, simultaneously make a path character sequence corresponding to the page, and also comprise a control table for making the path and the user agreement confirmation page correspond each other.

Next, the HTTP proxy processing section 301 receives a CONNECT to the destination sever of the redirect destination URL instructed in the step S601, that is, to the gateway server 30 itself (step S602).

Next, the HTTP proxy processing section 301 performs the CONNECT receiving processing shown in FIG. 4 (step S603). Here, in the encryption communication setting database 401 is set in advance such a setting that the CONNECT method to the gateway server 30 performs the End-End SSL encryption communication processing. To be more precise, the following entries 4019 are made in advance: in the server name field 4011, a host name "Gateway Server" for expressing the gateway server 30 having the encryption communication processing section 303; in the communication method field 4012, an "End-End SSL" communication method; in the client IP address field 4013 and the effective date 4014, "Not Specified"; and in the encryption communication relay permit field 4015 and the private key field 4016, "No Data".

According to these, the HTTP proxy processing section 301 determines that the received CONNECT method here is the connection request of the "End-End SSL" communication method to the gateway server 30 itself. Then the HTTP proxy processing section 301 performs processing for receiving and handing over data between itself and the encryption communication processing section 303. Hereafter the encryption communication processing section 303 communicates with the client device 10. The HTTP proxy processing section 301 sends data received and handed over from the encryption communication processing section 303 to the client device 10 as it is, or adding and deleting an HTTP header for a communication between the client device 10 and the processing section 301. In addition, the HTTP proxy processing section 301 similarly hands over data received from the client device 10 to the encryption communication processing section 303.

Next, after sending the client device 10 a response to the CONNECT method, the encryption communication processing section 303 performs an SSL handshake (steps S604 and S605). Then the encryption communication processing section 303 receives the access request to the redirect destination URL instructed in the step S601 in an encrypted state (step S606), and decrypts it.

Next, the encryption communication processing section 303 encrypts the user agreement confirmation page with an SSL and sends it to the client device 10 (steps S607 and S608). The user agreement confirmation page is a content for confirming a user agreement by the browser of the client device 10 with respect to terminating and relaying an encryption communication by the gateway server 30. In a case that the user agreement can be obtained, an access request including a parameter for indicating the user agreement is sent to the gateway server 30 in an encrypted state (step S609).

In a case that the user agreement cannot be obtained, the access request is not sent or an access request including a parameter for indicating a user rejection is sent in an encrypted state. In a case of having received the access request with the rejection parameter, the encryption communication processing section 303 may also make a response of being unable to relay the encryption communication. In addition, further memorizing a CONNECT destination server name then, after then, when receiving a CONNECT method from the client device 10, the encryption communication processing section 303 may also make a response of indicating an access rejection for a definite time if the content server 20 of the CONNECT destination was rejected before by the same user.

When receiving the access request in the step S609, the encryption communication processing section 303 performs the error processing (the step S109) if a predetermined time limit passes (NO in step S610) after making the response of the user agreement confirmation page in the step S607. Otherwise (YES in the step S610), the encryption communication processing section 303 encrypts the route CA certificate (own signature certificate) of the gateway server 30, and sends it to the client device 10 (steps S611 and S612).

Here, the encryption communication processing section 303 makes wording, which instructs a user so as to install a downloaded route CA certificate in the browser of the client device 10, included in any one of the user agreement confirmation page and another page prepared before sending the route CA certificate; thereby may also instruct her or him to install the downloaded route CA certificate in the browser of the client device 10; and then ends the user agreement confirmation processing.

Figure 13:
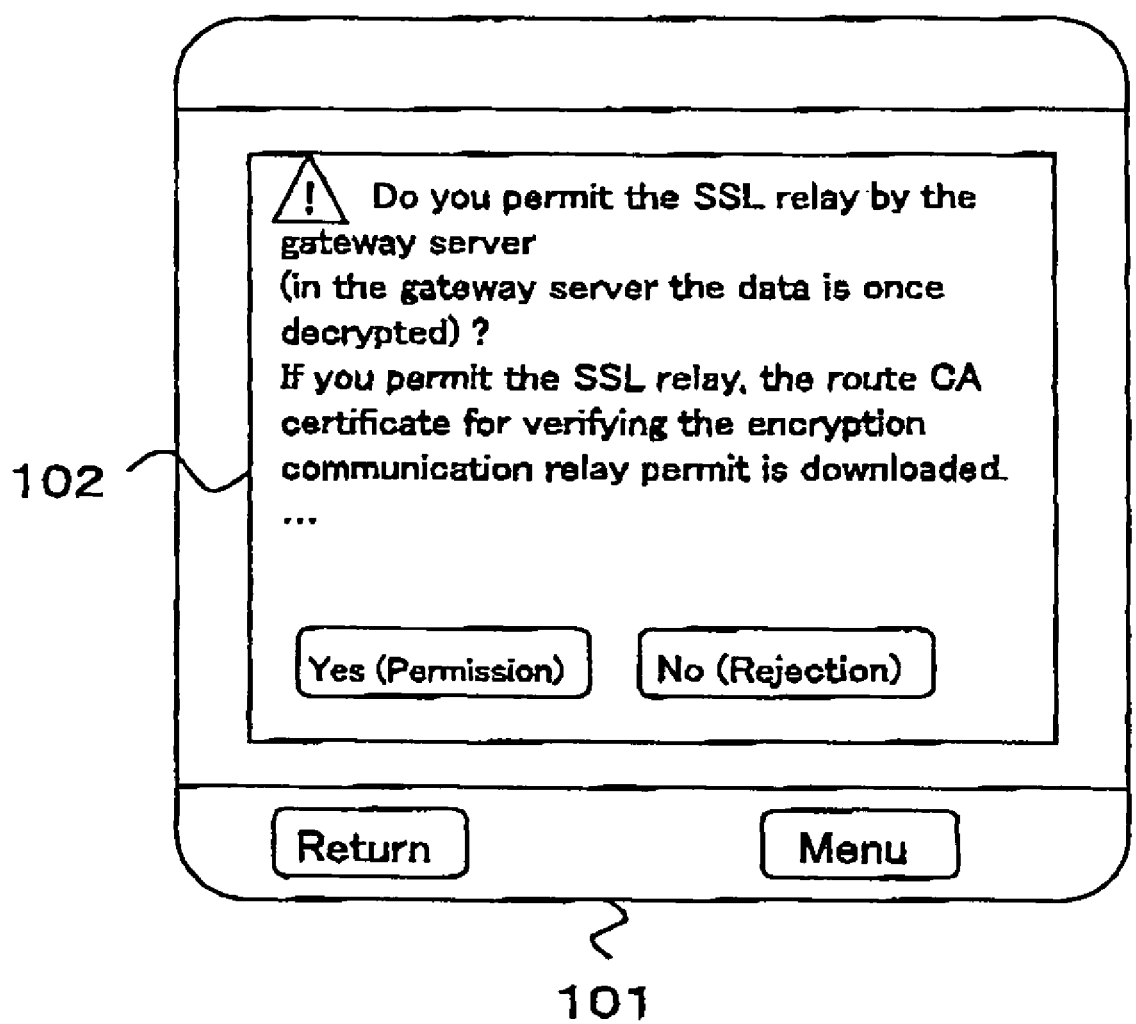
FIG. 13 is a drawing showing an example of a user agreement confirmation page used in the user agreement confirmation processing in FIG. 12.

FIG. 13 is a drawing showing an example of a user agreement confirmation page used in the user agreement confirmation processing in FIG. 12.

The user agreement confirmation page is a content described so that the browser of the client device 10 displays a wording 102 in a display 101 for confirming an agreement in receiving the confirmation page. As a concrete example is cited an HTML page; however, not a text document but an application that displays the wording 102 is also available for the user agreement confirmation page. The wording 102 is, for example, such a message that makes a user select whether or not to permit a termination and decryption (Split SSL encryption communication) of an encryption communication in the gateway server 30.

<Complement: Example of Value Added Processing>

Figure 14:
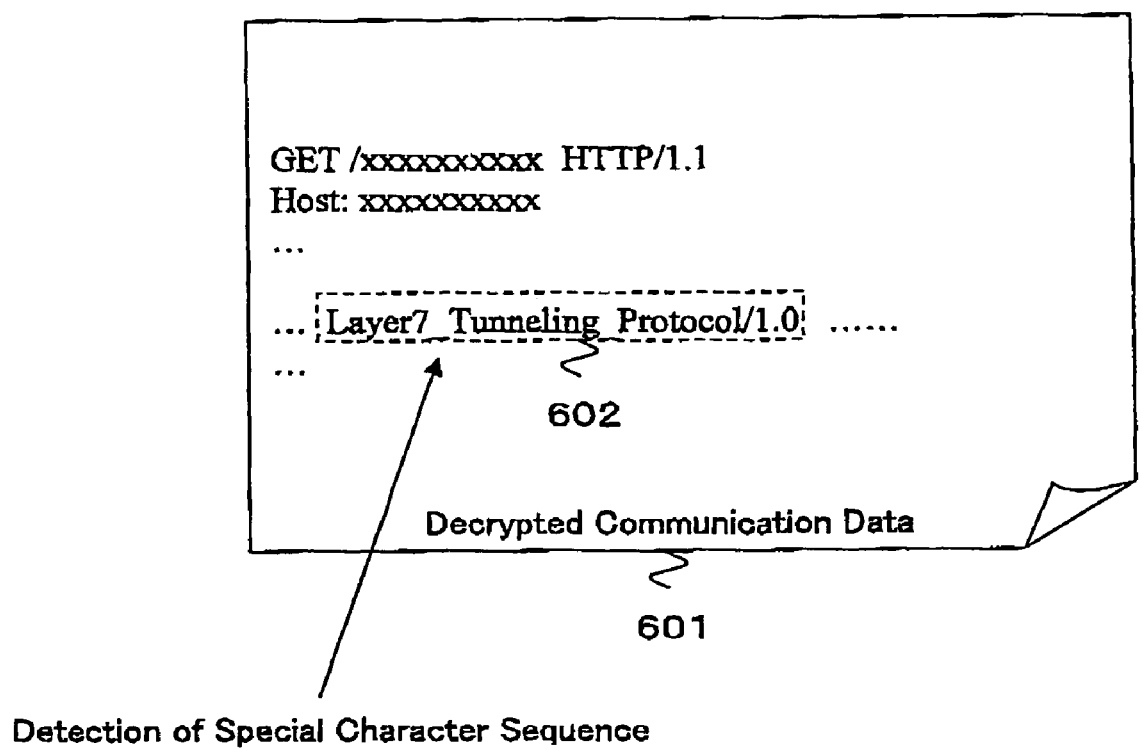
FIG. 14 is a drawing showing an example of performing value added processing in the first embodiment of the present invention.

FIG. 14 is a drawing showing an example of performing value added processing in the embodiment.

In the embodiment the HTTP proxy processing section 301 analyzes a communication data 601 of a plain text decrypted by the processing in the step S406 (see FIG. 8), and searches whether or not a specific data array 602 is included. In an example of FIG. 14 a character sequence of "Layer7#Tunneling#Protocol/1.0" is searched. Here, there may a plurality of kinds of specific data arrays 602. In a case of detecting that the specific data array 602 is included in the communication data 601 already decrypted, the HTTP proxy processing section 301 cuts off the connection; or else, after sending an encrypted error response, the processing section 301 cuts off the connection.

In other words, the HTTP proxy processing section 301 can analyze a content of an access request of when the client device 10 accesses the content server 20, detect a communication of an unjust purpose, and block it. Because the HTTP proxy processing section 301 can also analyze a content of the communication data 601 sent to the content server 20 from the client device 10, it is enabled to prevent a document administered as a secret document, for example, within an intranet from being unjustly or erroneously sent outside the intranet.

Furthermore, the HTTP proxy processing section 301 analyzes the decrypted communication data 601 by the processing in the step S503 (see FIG. 9), and after then, in a case that the communication data 601 is an image file, the processing section 301 performs an image conversion as the processing in the step S504. For example, in a case that a Web browser does not support the image file of a certain format, the HTTP proxy processing section 301 converts the communication data 601 to the image file of another format supported by the Web browser; or else the processing section 301 performs such processing as changing a size of the image file, depending on a resolution of the display 101 of the client device 10.

Similarly, the HTTP proxy processing section 301 analyzes the communication data 601 sent from the content server 20 and decrypted, and thereby, can detect a virus and other harmful information. Processing for detecting such the harmful information may be assumed to be the value added processing. In this case it is enabled to prevent the harmful information from invading the intranet where the client device 10 is connected.

<Action and Effect in the First Embodiment>

In the embodiment encryption communications are performed between the client device 10 and the gateway server 30 and between the gateway server 30 and the content server 20, respectively. Therefore, it is enabled to keep a security of a communication between the client device 10 and the content server 20.

In addition, the embodiment once terminates the End-End encryption communication performed between the client device 10 and the content server 20 in the gateway server 30, and returns an encrypted communication message to a plain text. Therefore, the embodiment can perform detection processing of a virus and a secret document in the communication message; caching of content data; and processing such as an addition, conversion, and delete of an HTTP header and data.

Although if a verification of a server public key certificate fails, some browser of the client device 10 displays a warning message that the content server 20 is unreliable, some user does not understand its meaning, ignores it, and accesses the server 20. In the embodiment, in the step S414 the gateway server 30 performs the verification of the server public key certificate, then performs the error processing (step S109), and thereby, it becomes able to prevent the user from accessing an unreliable content server 20.

In addition, in a case that the client device 10 downloads a server public key certificate issued by a CA not relied on by the route CA, some browser of the client device 10 issues a warning message in verifying the certificate and notices a user of it. Furthermore, some browser rejects an access to the content server 2 indicated by the server public key certificate in an encryption communication. In the embodiment, because it is designed to perform the user agreement confirmation processing (step S600), and a user results in installing the route CA certificate of the gateway server 30 in the browser of the client device 10, it is enabled hereafter for her or him to suppress the display of the warning message displayed in downloading the encryption communication relay permit 40151. In addition, when verifying the certificate failed, it becomes able for a browser rejecting an encryption communication to perform the encryption communication with the gateway server 30.

In the embodiment, in a case that any one of the gateway server 30 and the database server 40 is attacked and invaded by a malicious third person, there is a possibility that any of such a private key and a common key used in an encryption communication is stolen by her or him. Consequently, performing the user agreement confirmation processing, it is enabled to explicitly notice a user of there remaining a risk such as a tapping and tampering of encryption communication data. In a case of any one of not being able to permit such the risk or not wanting the termination and decryption of the encryption communication in the gateway server 30, the user can perform her or his own selection of not performing the Split SSL processing as a response to a warning message in the user agreement confirmation processing.

Or else, in the encryption communication setting database 401, by making a user able to change the setting of the communication method field 4012 for the server name field 4011, she or he can select to use which one of the End-End encryption communication and the Split SSL encryption communication for every destination server. As an advantage thereof, the user herself or himself can select either a security or a convenience, depending on her or his intention and a communication content. For example, if a user wants to place much value on the security in such a case of sending a credit card number to a sever, she or he may set the End-End encryption communication. On the contrary, if the user wants to place much value on the convenience in such a case of making a certain image content an image conversion in the gateway server 30, depending on a characteristic of a Web browser, the user herself or himself may set the Split SSL encryption communication.

In addition, in the embodiment it is enabled to make the database server 40 independent of the gateway server 30, and to realize a load dispersion of the sever 30 in a case that it is plurally arranged. In addition, because it is enabled to install more gateway servers 30, depending on a traffic amount from the client server 10, it is enabled to scalably enlarge a network system, where the present invention is applied, till the database server 40 reaches a performance limit.

Second Embodiment

Figure 15:
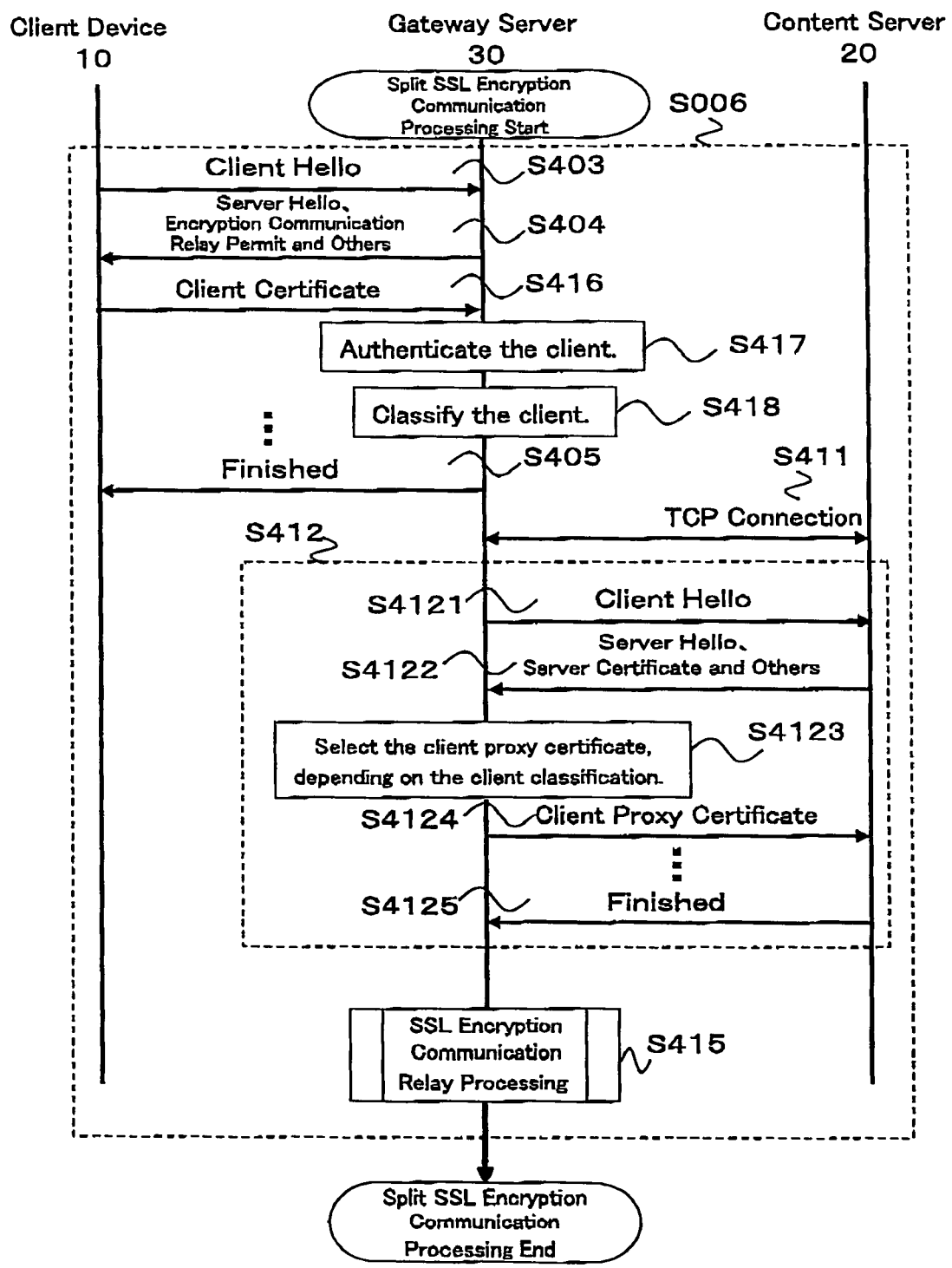
FIG. 15 is a drawing showing Split SSL encryption communication processing in a case of grouping clients and performing a proxy authentication in a second embodiment of the present invention.

Next will be in detail described a second embodiment of the present invention, referring to FIG. 15.

FIG. 15 is a drawing showing Split SSL encryption communication processing in a case of grouping clients and performing a proxy authentication. In the embodiment the gateway server 30 performs a client authentication for the client device 10, after then, uses another client authentication (client proxy certificate) different from that of the client device 10 for the content server 20, and performs the client authentication, depending on the client device 10.

In FIG. 15 the encryption communication section 303 (see FIG. 3) of the gateway server 30 sends the client device 10 a response to a CONNECT method, and after then, performs the SSL handshake (steps S403 to S405). In the SSL handshake the encryption communication section 303 performs the step S404, after then, receives a client certificate from the client device 10 (step S416), and performs client authentication processing (step S417). After then the gateway server 30 performs client classification processing (step S418).

As an example of the client classification processing, it is assumed that: a client A can access a content server A but not a content server B; and another client B can access both of the content servers A and B. Here, in a case of receiving a client certificate from the client A, the client classification processing classifies it as a client kind A; in a case of receiving a client certificate from the client B, the client classification processing classifies it as a client kind B.

If the encryption communication processing section 303 ends the SSL handshake processing with the client device 10 in the step S405, this time it performs a TCP connection between itself and the content server 20 (step S411). Then the encryption communication processing section 303 performs the SSL handshake processing between itself and the content server 20 (step S412, that is, steps 4121 to 4125). Here, the encryption communication processing section 303 ends server authentication processing (step S4122) for the content server 20, and after then, selects (step S4123) the client proxy certificate depending on the client classification in the step S418. For example, in the previous example, if the client device 10 is the client A, the encryption communication processing section 303 selects the client proxy certificate for the client kind A.

Next, when the encryption communication processing section 303 performs a client authentication for the content server 20, it sends (step S4124) the client proxy certificate selected in the step S4123 instead of the client certificate of the client device 10. Thereafter, the encryption communication processing section 303 performs a usual SSL handshake processing (steps S4124 and S4125), and subsequently performs the SSL encryption communication relay processing (step S415).

In the embodiment it becomes unnecessary for the content server 20, namely, a content provider to perform a client authentication of every client, and it results in performing the client authentication of a client kind provided by a network administrator with respect to clients controlled by the gateway server 30. For example, in a case that there exists an ISP network system enrolled by ten million persons, a larger scale authentication administration system to authenticate the ten million persons is conventionally requested for the content server 20 (content provider). On the other hand, because in the embodiment the gateway server 30 performs the client authentication in a lump by proxy, it is sufficient for a content provider to only introduce a smaller scale authentication system.

What is claimed is:

1. A relay method of an encryption communication in a gateway server for relaying the encryption communication performed between a client device and a content server, wherein the gateway server includes a database for registering a temporary encryption communication relay permit, a private key, an effective date of the private key, a host name of said content server, an IP address of said client device, and an encryption communication method name, the method performed by the gateway server comprising:

a first step of receiving said encryption communication connection message to said content server from said client device;

a second step of searching said database with making both said host name of said content server and said IP address of said client device included in said encryption communication connection message as a search key, and resultingly, when there exists registration information matching said search key and the effective date included in the registration information is within an effective period, reading said temporary encryption communication relay permit and the private key for said content server from said registration information, a third step of, when there exists no registration information matching said search key or when the effective date included in the registration information is out of date even if there exists the registration information matching said search key, producing a temporary encryption communication relay permit, a private key for said content server, and registering in said database said produced temporary encryption communication relay permit, the private key, the effective date of the private key, the host name of said content server, the IP address of said client device, and said encryption communication method name;

a fourth step of sending said temporary encryption communication relay permit to said client device;

a fifth step of performing an encryption communication with said client device, receiving an encrypted access request message, and decrypting the encrypted access request message;

a sixth step of performing an encryption communication with said content server, and acquiring content information; and a seventh step of performing value added processing for the acquired content information and/or a communication header thereof, encrypting said content information and said communication header, and sending said content information encrypted and said communication header encrypted to said client device.

2. The relay method according to claim 1, wherein said database is a database configured on another information processing unit different from said gateway server.

3. The relay method according to claim 1 performed by the gateway server further comprising:

an eighth step of, after said first step and before said forth step, sending said client device agreement confirmation display information for obtaining a user agreement of said client device with respect to decrypting said encrypted access message sent from said client device, and sending said client device a route certification authority certificate for verifying said temporary encryption communication relay permit when receiving an access request meaning the agreement confirmation of said user.

4. The relay method according to claim 1, wherein when said content server authenticates a client, said sixth step performed by said gateway server comprises the step of grouping said client device and sending a client proxy certificate produced, depending on the group instead of a client certificate sent by said client device.

5. A gateway server for relaying the encryption communication performed between a client device and a content server, the gateway server comprising:

a database for registering a temporary encryption communication relay permit, a private key, an effective date of the private key, a host name of said content server, an IP address of said client device, and an encryption communication method name, the gateway server further comprising:

a first mechanism for receiving the encryption communication connection message to said content server from said client device;

a second mechanism for searching the database with making both said host name of said content server and the IP address of the client device included in the encryption communication connection message as a search key, and resultingly, when there exists registration information matching said search key and the effective date included in the registration information is within an effective period, for reading the temporary encryption communication relay permit and the private key for said content server from the registration information;

a third mechanism, when there exists no registration information matching said search key or when the effective date included in the registration information is out of date even if there exists the registration information matching said search key, for producing a temporary encryption communication relay permit, a private key for said content server, and registering in said database the produced temporary encryption communication relay permit, the private key, the effective date of the private key, the host name of said content server, the IP address of the client device, and the encryption communication method name;

a fourth mechanism for sending said temporary encryption communication relay permit to said client device;

a fifth mechanism for performing an encryption communication with said client device, receiving an encrypted access request message, and decrypting the encrypted access request message;

a sixth mechanism for performing an encryption communication with said content server, and acquiring content information; and a seventh mechanism for performing value added processing for the acquired content information and/or a communication header thereof, encrypting said content information and said communication header, and sending said content information encrypted and said communication header encrypted to said client device.

6. The gateway server according to claim 5 further comprising an eighth mechanism for sending said client device agreement confirmation display information for obtaining a user agreement of said client device with respect to decrypting said encrypted access message sent from said client device, and sending said client device a route certification authority certificate for verifying said temporary encryption communication relay permit when receiving an access request meaning the agreement confirmation of said user.

7. The gateway server according to claim 5, wherein when said content server authenticates a client, said sixth mechanism groups said client device and sends a client proxy certificate produced, depending on the group instead of a client certificate sent by said client device.

8. A relay method of an encryption communication in a gateway server for relaying the encryption communication performed between a client device and a content server, wherein the gateway server includes a database for registering interrelated information for each pair of said content server and said client device which is registered, said interrelated information including: a temporary encryption communication relay permit, a private key, an effective date of the private key, a host name of said content server, an IP address of said client device, and an encryption communication method name, the method performed by the gateway server comprising:

a first step of receiving said encryption communication connection message to said content server from said client device;

a second step of searching said database with making both said host name of said content server and said IP address of said client device included in said encryption communication connection message as a search key, and resultingly, when there exists registration information matching said search key and the effective date included in the registration information is within an effective period, reading said temporary encryption communication relay permit and the private key for said content server from said registration information, a third step of, when there exists no registration information matching said search key or when the effective date included in the registration information is out of date even if there exists the registration information matching said search key, producing a temporary encryption communication relay permit, a private key for said content server, and registering in said database said produced temporary encryption communication relay permit, the private key, the effective date of the private key, the host name of said content server, the IP address of said client device, and said encryption communication method name;
a fourth step of sending said temporary encryption communication relay permit to said client device;
a fifth step of performing an encryption communication with said client device, receiving an encrypted access request message, and decrypting the encrypted access request message;

a sixth step of performing an encryption communication with said content server, and acquiring content information; and a seventh step of performing value added processing for the acquired content information and/or a communication header thereof, encrypting said content information and said communication header, and sending said content information encrypted and said communication header encrypted to said client device.

* * * * *